US011599951B1

(12) United States Patent
Gross et al.

(10) Patent No.: US 11,599,951 B1
(45) Date of Patent: Mar. 7, 2023

(54) SYSTEMS AND METHODS FOR GENERATING ON-DEMAND INSURANCE POLICIES

(71) Applicant: State Farm Mutual Automobile Insurance Company, Bloomington, IL (US)

(72) Inventors: Ryan Michael Gross, Normal, IL (US); Jody Ann Thoele, Bloomington, IL (US); Joseph Robert Brannan, Bloomington, IL (US); Eric R. Moore, Heyworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 107 days.

(21) Appl. No.: 17/127,410

(22) Filed: Dec. 18, 2020

Related U.S. Application Data

(60) Provisional application No. 62/984,664, filed on Mar. 3, 2020, provisional application No. 62/960,395, filed on Jan. 13, 2020.

(51) Int. Cl.
*G06Q 40/08* (2012.01)
*G06Q 10/10* (2023.01)
(Continued)

(52) U.S. Cl.
CPC .......... *G06Q 40/08* (2013.01); *G06F 3/0482* (2013.01); *G06Q 10/10* (2013.01); *G06Q 50/14* (2013.01);
(Continued)

(58) Field of Classification Search
CPC ........ G06Q 40/08; G06Q 10/10; G06Q 50/14; G06Q 50/26; G06Q 50/30; G06F 3/0482; G09B 19/00; G06N 20/00
(Continued)

(56) References Cited

U.S. PATENT DOCUMENTS 7,761,062 B2   7/2010  Mervine
8,725,612 B2   5/2014  Mundinger et al.
(Continued)

FOREIGN PATENT DOCUMENTS

CN    105389986 A    3/2016
CN    105389986 B    4/2018
(Continued)

OTHER PUBLICATIONS

Azzopardi et al., "Implementing Automotive Telematics for Insurance Covers of Fleets", Journal of Technology Management & Innovation, vol. 8, Issue 4, Dec. 12 (Year: 2013).*
(Continued)

*Primary Examiner* — Frantzy Poinvil
(74) *Attorney, Agent, or Firm* — Armstrong Teasdale LLP

(57) ABSTRACT

An on-demand insurance (ODI) server for generating dynamic user offerings may be provided. The ODI server may include at least one processor in communication with a memory device. The at least one processor may be programmed to (i) receive, from a user computing device associated with a user, an insurance policy request for a trip from a start location to an end location, (ii) determine at least one transportation mode available for the trip, (iii) access contextual data associated with the trip, (iv) assess a risk associated with the at least one transportation mode, (v) calculate a risk score associated with the at least one transportation mode based upon at least the contextual data, (vi) generate an insurance offering associated with the at least one transportation mode, and/or (vii) transmit the insurance offering in real time to the user computing device for purchase by the user.

20 Claims, 13 Drawing Sheets

(51) Int. Cl.
*G06Q 50/14* (2012.01)
*G06Q 50/26* (2012.01)
*G09B 19/00* (2006.01)
*G06F 3/0482* (2013.01)
*G06Q 50/30* (2012.01)
*G06N 20/00* (2019.01)

(52) U.S. Cl.
CPC .............. *G06Q 50/26* (2013.01); *G06Q 50/30* (2013.01); *G09B 19/00* (2013.01); *G06N 20/00* (2019.01)

(58) Field of Classification Search
USPC ........................................................ 705/3–44
See application file for complete search history.

(56) References Cited

U.S. PATENT DOCUMENTS

| | | |
|---|---|---|
| 9,311,271 B2 | 4/2016 | Wright |
| 9,633,487 B2 | 4/2017 | Wright |
| 9,646,428 B1 * | 5/2017 | Konrardy .............. B60W 40/09 |
| 9,710,975 B2 | 7/2017 | Jefferies et al. |
| 9,805,422 B1 | 10/2017 | May et al. |
| 9,875,508 B1 | 1/2018 | Yager et al. |
| 10,102,586 B1 | 10/2018 | Marlow et al. |
| 10,109,013 B1 | 10/2018 | Cripe et al. |
| 10,192,369 B2 | 1/2019 | Wright |
| 10,198,879 B2 | 2/2019 | Wright |
| 10,229,462 B2 | 3/2019 | Bogovich et al. |
| 10,621,670 B2 | 4/2020 | Fuchs |
| 10,664,917 B1 * | 5/2020 | Wasserman ........ G01C 21/3453 |
| 10,726,495 B1 | 7/2020 | Saenglongma |
| 10,803,526 B1 * | 10/2020 | Hayward ............ G06Q 30/0272 |
| 11,107,104 B1 * | 8/2021 | Brannan ................. H04W 4/00 |
| 11,257,165 B1 | 2/2022 | Norton et al. |
| 11,468,516 B2 * | 10/2022 | Wasserman ............ G06Q 40/08 |
| 2007/0288270 A1 * | 12/2007 | Gay ....................... G06Q 40/08 705/4 |
| 2007/0299700 A1 * | 12/2007 | Gay ....................... G06Q 30/06 705/4 |
| 2011/0213629 A1 | 9/2011 | Clark et al. |
| 2011/0288891 A1 | 11/2011 | Zaid |
| 2013/0297418 A1 * | 11/2013 | Collopy ............. G06Q 30/0201 705/14.53 |
| 2014/0052479 A1 | 2/2014 | Kawamura |
| 2014/0195272 A1 * | 7/2014 | Sadiq ..................... G06Q 40/08 705/4 |
| 2014/0222469 A1 | 8/2014 | Stahl et al. |
| 2014/0379385 A1 | 12/2014 | Duncan et al. |
| 2015/0025917 A1 | 1/2015 | Stempora |
| 2015/0254581 A1 | 9/2015 | Brahme |
| 2016/0189303 A1 | 6/2016 | Fuchs |
| 2019/0026364 A1 * | 1/2019 | Sankovsky ............ G06Q 40/08 |
| 2020/0234382 A1 | 7/2020 | Fuchs |
| 2020/0394455 A1 | 12/2020 | Lee et al. |

FOREIGN PATENT DOCUMENTS

| | | | |
|---|---|---|---|
| CO | 6230164 A1 | 12/2010 | |
| EP | 2218061 B1 | 11/2014 | |
| EP | 3420313 A1 | 1/2019 | |
| JP | 2021128640 A | 9/2021 | |
| KR | 20090101133 A | 9/2009 | |
| KR | 2015036212 A | 4/2015 | |
| KR | 2019063956 A | 6/2019 | |
| WO | 2009065638 A1 | 5/2009 | |
| WO | WO-2010062899 A1 * | 6/2010 | ......... G06Q 30/0201 |
| WO | 2014028010 A2 | 2/2014 | |
| WO | 2017146790 A1 | 8/2017 | |

OTHER PUBLICATIONS

Steinbach, Mark, "One Day Car Insurance Quotes (2020)", Blog, Aug. 12, 2020, Insurify, Inc., URL: https://insurify.com/blog/car-insurance/one-day-car-insurance/, 9 pages, [retrieved on Nov. 25, 2020].

Taylor, Joshua, "CarSharing Insurance", Oct. 6, 2020, WalletHub, URL: https://wallethub.com/edu/oi/car-sharing-insurance/13783, 7 pages, [retireved on: Nov. 25, 2020].

* cited by examiner

SYSTEMS AND METHODS FOR GENERATING ON-DEMAND INSURANCE POLICIES

CROSS-REFERENCE TO RELATED APPLICATIONS

This application claims priority to, and claims the benefits of, U.S. Provisional Patent Application Ser. No. 62/984,664, filed Mar. 3, 2020, entitled "SYSTEMS AND METHODS FOR GENERATING ON-DEMAND INSURANCE POLICIES," and U.S. Provisional Patent Application Ser. No. 62/960,395, filed Jan. 13, 2020, entitled "SYSTEMS AND METHODS FOR GENERATING ON-DEMAND INSURANCE POLICIES," the entire contents and disclosures of which are hereby incorporated by reference in their entirety.

FIELD OF THE DISCLOSURE

The present disclosure generally relates to dynamic insurance policies, and more specifically, to systems and methods for generating dynamic insurance policies (e.g., for a user or a group of users) based upon the risk associated with a transportation mode or travel route.

BACKGROUND

The landscape of vehicle insurance coverage has been changing with the increased popularity of alternative transportation options, such as, for example, transportation network company services, public transportation, and walking. Utilizing these alternative forms of transportation to commute from place to place is becoming increasingly common. Further, users may switch from one transportation mode to another during a single trip and/or throughout the week based upon cost, available modes of transportation, time of day, day of the week, and location. Additionally, individuals generally use mobile devices (e.g., smartphones, tablets) for a variety of purposes and often carry mobile devices while traveling. Individuals may utilize mobile devices to schedule and request rides in real time with various transportation network company services.

However, at least some known insurance policies may not adequately provide coverage for these different types of transportation options. Conventional techniques may also be inconvenient, awkward, time consuming, and/or have additional drawbacks as well

BRIEF SUMMARY

The present embodiments may relate to, inter alia, systems and methods for generating dynamic and intelligent insurance offerings in real time. A computer system may be configured to recommend and/or push different modes of transportation and/or travel routes to a user based upon a risk level associated with a particular mode of transportation and/or travel route. The computer system may generate, on a trip-by-trip basis, recommendations for a particular mode of transportation and/or travel route to reduce the user's risk, and therefore, cost. The computer system may be configured to incorporate on-demand or additional insurance offerings based upon the user's own personal transportation options, such as, for example, a personal vehicle, scooter, and/or bike.

In one aspect, an on-demand insurance (ODI) server for generating dynamic user offerings may be provided. The ODI server may include at least one processor and/or associated transceiver in communication with a memory device. The at least one processor and/or associated transceiver may be programmed to (i) receive, from a user computing device associated with a user, an insurance policy request for a trip from a start location to an end location. The request may include trip data and a user identifier associated with the user. The at least one processor and/or associated transceiver may also be programmed to (ii) determine at least one transportation mode available for the trip; (iii) access, from the memory device, contextual data associated with the trip; (iv) assess, based upon at least the accessed contextual data, a risk associated with the at least one transportation mode; (v) calculate, based upon the assessment, a risk score associated with the at least one transportation mode based upon at least the contextual data; (vi) generate, based upon the calculated risk score, an insurance offering associated with the at least one transportation mode; and/or (vii) transmit the insurance offering in real time to the user computing device for purchase by the user. The on-demand insurance (ODI) server may include less, additional, and/or alternative functionality, including that described elsewhere herein.

In another aspect, a computer-implemented method for generating dynamic user offerings may be provided. The method may be implemented by an on-demand insurance (ODI) server including at least one processor and/or associated transceiver in communication with a memory device. The method may include, via the at least one processor and/or associated transceiver, (i) receiving, from a user computing device associated with a user, an insurance policy request for a trip from a start location to an end location. The request may include trip data and a user identifier associated with the user. The method may also include, via the at least one processor and/or associated transceiver, (ii) determining at least one transportation mode available for the trip; (iii) accessing, from the memory device, contextual data associated with the trip; (iv) assessing, based upon at least the accessed contextual data, a risk associated with the at least one transportation mode; (v) calculating, based upon the assessment, a risk score associated with the at least one transportation mode based upon at least the contextual data; (vi) generating, based upon the calculated risk score, an insurance offering associated with the at least one transportation mode; and/or (vii) transmitting the insurance offering in real time to the user computing device for purchase by the user. The method may include fewer, additional, and/or alternative steps, include those described elsewhere herein.

In a further aspect, a non-transitory computer-readable storage medium having computer-executable instructions embodied thereon may be provided. When executed by an on-demand insurance (ODI) server having at least one processor in communication with at least one memory device, the computer-executable instructions may cause the at least one processor and/or associated transceiver to (i) receive, from a user computing device associated with a user, an insurance policy request for a trip from a start location to an end location. The request may include trip data and a user identifier associated with the user. The instructions may cause the at least one processor and/or associated transceiver to (ii) determine at least one transportation mode available for the trip; (iii) access, from the memory device, contextual data associated with the trip, (iv) assess, based upon at least the accessed contextual data, a risk associated with the at least one transportation mode; (v) calculate, based upon the assessment, a risk score associated with the at least one transportation mode based upon at least the contextual data; (vi) generate, based upon the calculated risk score, an insurance offering associated with the at least one transportation mode; and/or (vii) transmit the insurance offering in real time to the user computing device for purchase by the user. The computer-executable instructions may provide additional, less, and/or alternative functionality, including that described elsewhere herein.

In yet another aspect, a computer system for providing a flex insurance policy may be provided. The computer system may include at least one processor and/or associated transceiver in communication with at least one memory device. The at least one processor and/or associated transceiver may be configured to (i) determine that a vehicle associated with a user is listed for rent on a peer-to-peer (P2P) car-sharing platform; and (ii) receive, from a computing device associated with the P2P car-sharing platform, vehicle listing information associated with the user. The vehicle listing information may include a user identifier associated with the user. The at least one processor and/or associated transceiver may also be configured to (iii) retrieve, from the memory device, a user profile associated with the user identifier. The user profile may include information associated with (a) a personal automobile insurance policy associated with the vehicle, and (b) a personal mobility policy associated with the user. The at least one processor and/or associated transceiver may also be configured to (iv) extract, from the user profile, a first identifier associated with the personal automobile insurance policy and a second identifier associated with the personal mobility policy; and/or (v) automatically transmit, to an insurance provider computing device, instructions to (a) suspend and/or otherwise adjust (such as adjust the price, limits, deductibles, and/or coverages of) the personal automobile insurance policy associated with the first identifier, and (b) activate and/or otherwise adjust (such as adjust the price, limits, deductibles, and/or coverages of) the personal mobility policy associated with the second identifier. The computer system may include less, additional, and/or alternative functionality, including that described elsewhere herein.

In another aspect, a computer-implemented method for providing a flex insurance policy may be provided. The method may be implemented by a computer system including at least one processor and/or associated transceiver in communication with at least one memory device. The method may include, via the at least one processor and/or associated transceiver, (i) determining that a vehicle associated with a user is listed for rent on a peer-to-peer (P2P) car-sharing platform; (ii) receiving, from a computing device associated with the P2P car-sharing platform, vehicle listing information associated with the user, the vehicle listing information including a user identifier associated with the user; (iii) retrieving, from the memory device, a user profile associated with the user identifier, the user profile including information associated with (a) a personal automobile insurance policy associated with the vehicle, and (b) a personal mobility policy associated with the user; (iv) extracting, from the user profile, a first identifier associated with the personal automobile insurance policy and a second identifier associated with the personal mobility policy; and/or (v) automatically transmitting, to an insurance provider computing device, instructions to (a) suspend and/or otherwise adjust (such as adjust the price, limits, deductibles, and/or coverages of) the personal automobile insurance policy associated with the first identifier, and (b) activate and/or otherwise adjust (such as adjust the price, limits, deductibles, and/or coverages of) the personal mobility policy associated with the second identifier. The method may include fewer, additional, and/or alternative steps, include those described elsewhere herein.

In a further aspect, a non-transitory computer-readable storage medium having computer-executable instructions embodied thereon may be provided. When executed by a computer system having at least one processor and/or associated transceiver in communication with at least one memory device, the computer-executable instructions may cause the at least one processor to (i) determine that a vehicle associated with a user is listed for rent on a peer-to-peer (P2P) car-sharing platform; (ii) receive, from a computing device associated with the P2P car-sharing platform, vehicle listing information associated with the user, the vehicle listing information including a user identifier associated with the user; (iii) retrieve, from the memory device, a user profile associated with the user identifier, the user profile including information associated with (a) a personal automobile insurance policy associated with the vehicle and (b) a personal mobility policy associated with the user; (iv) extract, from the user profile, a first identifier associated with the personal automobile insurance policy and a second identifier associated with the personal mobility policy; and/or (v) automatically transmit, to an insurance provider computing device, instructions to (a) suspend and/or otherwise adjust (such as adjust the price, limits, deductibles, and/or coverages of) the personal automobile insurance policy associated with the first identifier, and (b) activate and/or otherwise adjust (such as adjust the price, limits, deductibles, and/or coverages of) the personal mobility policy associated with the second identifier. The computer-executable instructions may provide additional, less, and/or alternative functionality, including that described herein.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
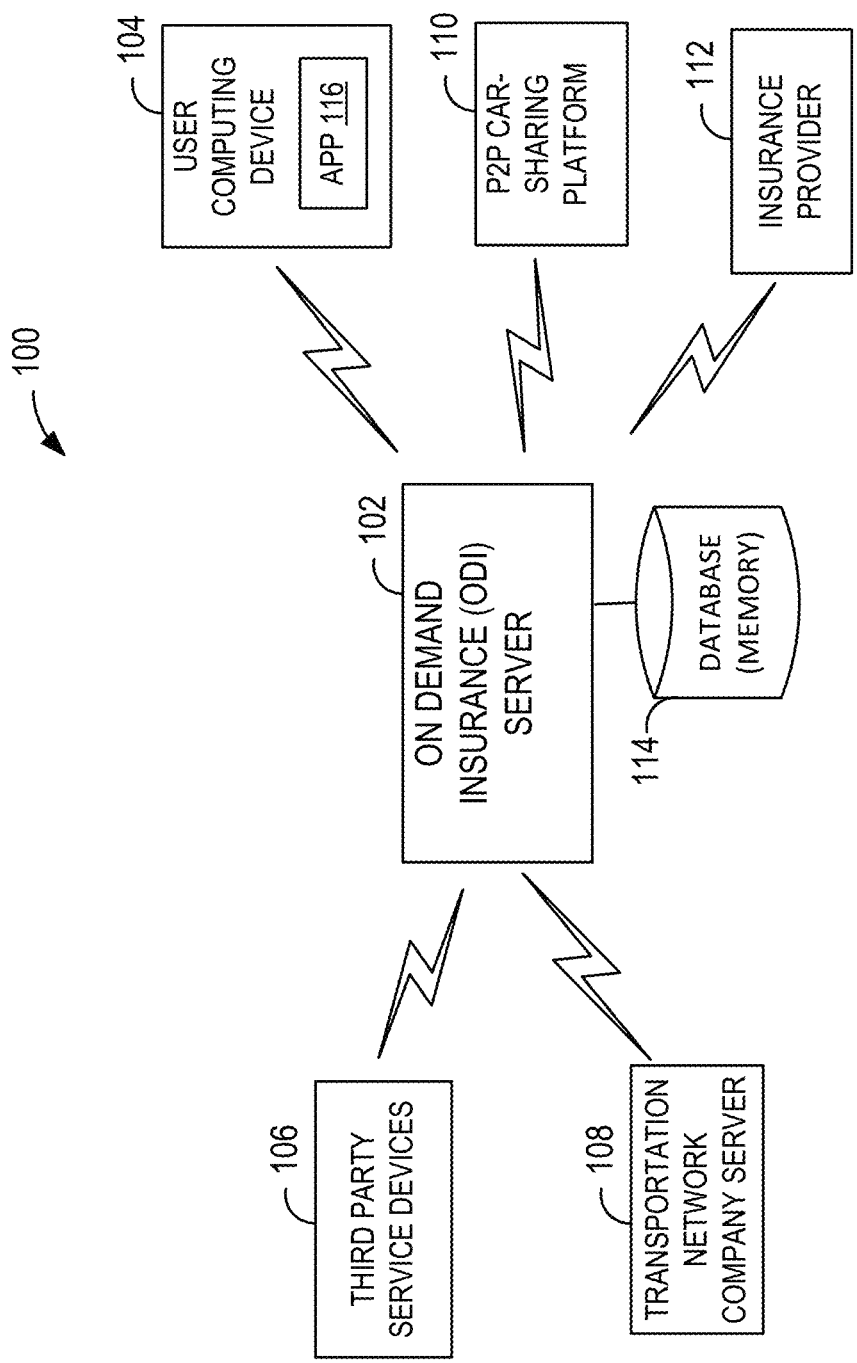
FIG. 1 illustrates a schematic diagram of an exemplary computer system including an on-demand insurance (ODI) server in accordance with the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for generating user offerings, including on-demand insurance offerings based upon the risk associated with a transportation mode and/or travel route. In particular, a computer system may include an on-demand insurance (ODI) server configured to receive, process, and synthesize data from a plurality of sources to offer users dynamic insurance pricings, recommendations, incentives, and the like, to change their behavior (e.g., to reduce risk, to encourage alternative forms of transportation, etc.). The ODI server may receive, for example, a request for insurance coverage from a user. Based upon situational data (e.g., contextual data) associated with the request as well as user data associated with the user's user profile, the ODI server may generate dynamic pricings for insurance offerings based upon a particular mode of transportation and/or travel route. Transportation modes and/or travel routes may be priced according to an associated risk to encourage users to select insurance coverage for a mode of transportation associated with a low level of risk to the user.

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, user-driven or user-operated vehicles, industrial vehicles (e.g., construction vehicles), "riding" lawnmowers, farm equipment, planes, helicopters, bicycles, flying cars, robo-taxis, self-driving taxis, and/or any kind of land-, water-, or air-based vehicle.

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

Automation systems include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or oversteering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane-keep assist systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

"App," as used herein, may refer generally to a software application installed and downloaded on a user computing device and executed to provide an interactive graphical user interface at the user computing device. An app associated with the computer system, as described herein, may be understood to be maintained by the computer system and/or one or more components thereof. Accordingly, a "maintaining party" of the app may be understood to be responsible for any functionality of the app and may be considered to instruct other parties/components to perform such functions via the app.

"Trip," as used herein, may refer generally to one complete use of a particular mode of transportation (e.g., type of travel) from a starting point to an ending point. Modes of transportation may include, but are not limited to, a personal vehicle, public transportation (e.g., buses, trolleys, trams, metro, subway, airlines, coaches, and rapid rail), taxis, ride-sharing services, scooters, bikes, etc.). In cases where a user is a vehicle driver, the trip may commence when the vehicle is started and may terminate when the vehicle is turned off. If a trip is defined in this way, the vehicle and/or the user's mobile computing device may automatically track and record trips, as commencement and termination are simply defined. In other cases where the user is a passenger of, for example, a public transportation service or a transportation network company service, such as a ride-sharing service, or where the user is riding a bike or scooter, the trip may be "manually" defined, such that the user designates a commencement and termination of a trip (e.g., when the user inputs and/or selects a destination using their mobile user computing device). In such cases, the on-demand insurance (ODI) server may prompt the user to designate the commencement and termination (e.g., using an app available on a user computing device) of the trip such that the user's trip may be tracked and recorded.

"Telematics data," as used herein, may refer generally to data associated with monitoring a moving computing device. Telematics data incorporates location, movement (e.g., speed, direction, acceleration, etc.), and condition (e.g., "on", "off", in-motion, etc.) data based upon a plurality of sensors on-board the computing device and/or connected to the computing device. Accordingly, where the computing device is associated with a vehicle, the telematics data may be associated with monitoring the vehicle. Where the computing device is a personal mobile computing device, such as a smart phone, the telematics data may be associated with monitoring the personal mobile computing device. In at least some cases, the personal mobile computing device may be used to capture vehicle telematics data, where the personal mobile computing device is present in/on a vehicle during motion/use of the vehicle.

"Sensor data," as used herein, may refer generally to data captured by sensors that is not necessarily associated with the movement of a computing device. For example, sensor data for a vehicle may include data that captures movement of occupants of the vehicle, which may not affect the motion of the vehicle. In some cases, telematics data may include sensor data, where data is sent in packets that include data from all sensors associated with a computing device (e.g., both motion and non-motion sensor data).

"Contextual data," as used herein, may refer generally to includes data not specific to the user but descriptive of the environment around and/or associated with the user at the time the telematics data (and/or sensor data) was captured. Contextual data may include ambient data (e.g., weather data, traffic data, market data), data associated with other computing devices or vehicles, policy data (e.g., posted speed limits, road closures, detours, etc.), cost data (e.g., gas prices, insurance policy premiums, maintenance costs, etc.), and the like. In some cases, contextual data is accessed from one or more third-party sources. Additionally or alternatively, contextual data is collected from sensors on one or more computing devices within the computer system described herein (e.g., user computing devices).

"Personal mobility (PM) insurance" or "personal mobility policy (PMP)," as used herein, may refer generally to insurance policies based upon a user's usage of various forms of transportation. As increasingly more personal mobility options (e.g., modes of transportation) become available, users have more options to choose from when it comes to travel. Personal mobility insurance may provide coverage when a user is a pedestrian, a passenger of a ride-sharing service, and/or a driver of a rental vehicle, a semi-autonomous vehicle, and/or an autonomous vehicle. In other cases, personal mobility insurance may provide a user with coverage when the user rides a bike or an electric scooter.

Personal mobility insurance further provides coverage in cases where a user may not own a vehicle and/or not drive. For example, the user may travel from place to place by using various alternative forms of transportation, including walking, biking, using public transportation, and/or using ride-sharing services. In these cases, personal mobility insurance may offer coverage if the user is injured as (i) a ride-share service passenger due to the driver's negligence or fault, (ii) a pedestrian getting into or out of a ride-share vehicle, and/or (iii) a bike or electric scooter rider due to being injured by an uninsured motorist.

In some embodiments, personal mobility insurance may be associated with an alternative policy, such as a personal automobile insurance and/or a vehicle rental insurance. For example, a user's coverage may switch between the user's personal automobile insurance and the user's personal mobility insurance depending on whether the user elects to use their personal vehicle or a different mode of transportation, such as a ride-sharing service, to travel from one place to another. The cost of the personal mobility policy may depend on various factors, including, but not limited to, mode of transportation and risk associated with each mode of transportation.

Additionally, the present embodiments may relate to micro-mobility or micro mobility trends. For instance, the PMP or other insurance policies may cover micro-mobility forms of transformation and/or provide micro-mobility coverage on demand. The present embodiments may provide micro-mobility coverage or micro-mobility insurance for short distance travel—such as the first mile of a trip (such as to reach or travel to a public transportation or a ride share pick-up point), or the last mile of the trip (such as to reach or travel to a final destination, such as via e-scooter or bike).

In some embodiments, the micro-mobility coverage or insurance may be in the form of UBI (Usage-based Insurance). UBI micro-mobility coverage may be sold by time or mileages, or other units (e.g., rides, trips), for instance. In one embodiment, the micro-mobility coverage may cover modes of transportation and/or vehicles with speeds less than 20 mph, carry 1 or 2 people, and associated with trips of short distances (such as a 1 or 2 miles).

"On-demand insurance," as used herein, may refer generally to providing PMP (personal mobility policy) and/or micro-mobility UBI (usage-based insurance) quotes to a user in real time when coverage is requested by a user. On-demand insurance may provide coverage on a pay-as-you-go basis for each trip taken by the user (e.g., insurance provided on a trip-by-trip basis), as opposed to paying for coverage for a standard period of time (e.g., six months). For example, coverage may be requested or purchased for certain trips a user plans to take. PMP and/or micro-mobility insurance may be offered in various units, such as miles, time units, or rides. Micro-mobility insurance may cover short trips, such as the first mile and/or the last mile to a destination. For instance, the first mile and/or last mile to a destination may include users traveling by alternate forms of transportation, such as public transportation, ride shares, bicycles, or e-scooters.

As noted above, in some aspects, the present embodiments may provide insurance coverage in real time, or in near real time, on a trip-by-trip basis based upon the risk associated with a particular transportation mode or travel route. On-demand insurance policies with dynamic pricings may be provided to a user in real time, or in near real time, (such as via their mobile device or other computing device (e.g., wearable, smart watch, or smart glasses)), based upon the risk associated with available modes of transportation and travel routes.

Exemplary Embodiments

In an exemplary embodiment, a computer system may be configured to generate dynamic and intelligent insurance offerings. The computer system may be configured to proactively recommend and/or push different modes of transportation and/or travel routes to a user based upon a risk level associated with a particular mode of transportation and/or travel route. The computer system may generate, on a trip-by-trip basis, recommendations for a particular mode of transportation and/or travel route to reduce the user's risk, and therefore, cost. The computer system may be configured to incorporate on-demand or additional insurance offerings based upon the user's own personal transportation options, such as, for example, a personal vehicle, scooter, and/or bike. In the exemplary embodiment, the computer system may include at least one on-demand insurance (ODI) server. The ODI server may be configured to perform the functions that may be more generally described herein as being performed by and/or attributed to the overall computer system.

In particular, in an exemplary embodiment, the ODI server may be in communication with one or more computing devices associated with a user, such as via wireless communication over one or more radio frequency links. These user computing devices may include a "mobile device," such as a smartphone, a tablet, wearable, smart watch, smart glasses, and the like. In the exemplary embodiment, the ODI server offers situational (e.g., contextual) on-demand insurance that may take into consideration multiple forms of data associated with an on-demand insurance request, which may include, but are not be limited to, time of day, day of the week, weather, location, age of user, and the like. For example, based upon contextual data (e.g., situational data) associated with an on-demand insurance request, the ODI server may determine that the requesting user is a person between the ages of 21-25 on a college campus on a Friday or Saturday night after the nearby bars are closed.

Based upon this determination, the ODI server may determine that the user most likely poses a high level of risk to themselves if they utilize a scooter as a transportation mode. In this example, the ODI server may determine that the risk to a user who requests a scooter ride on a Sunday afternoon may be less than the risk to a user who requests a scooter ride late at night on a Friday or Saturday. Accordingly, in this example, based upon the assessed risk, the ODI server may price on-demand insurance coverage for a scooter ride on a Sunday afternoon as one dollar, but on a weekend night as five dollars to more accurately match price to actual risk. Thus, in the exemplary embodiment, the ODI server may be configured to generate dynamic pricings for insurance offerings based upon the time and/or day, as well as the transportation mode selected by a user requesting insurance coverage.

In one exemplary embodiment, the ODI server may be configured to provide discounts for transportation modes associated with a low level of risk. For example, when a user tries to book the scooter at 2 AM on a Saturday, an app associated with the ODI server may notify the user of the five dollar insurance cost for the ride, but may also inform the user that a transportation network company service, such as, for example, an LIBER ride may only cost ten cents for insurance. The ODI server may be configured to assess risk factors and calculate risk scores associated with transportation modes to generate dynamic pricings, and thereby to influence the travel behavior of users by trying to keep users safe while in transit and to reduce the number of insurance claims. Calculated risk scores may be compared to a threshold value associated with an average level of risk for a corresponding transportation mode. Risk scores that are above the threshold value may be categorized as high risk (e.g., high level of risk to the user) transportation modes. Risk scores that are below the threshold value may be categorized as low risk (e.g., low level of risk to the user).

In another example, a user may take a trip to downtown Chicago. The ODI server may analyze situational data, transportation data, and trip data to determine that, during the spring, the transportation mode associated with the least amount of risk is a DIVVY bike. The ODI server may also determine that the transportation mode associated with the least amount of risk when the weather is poor is utilizing a transportation network company service, such as LIBER. The ODI server may offer discounts for the safest mode of transportation in each situation to encourage users to select safer travel options.

In one exemplary embodiment, the ODI server may create a user-based game (e.g., challenge) environment configured to motivate and encourage users to utilize transportation modes that are associated with a low level of risk given the situation. The ODI server may recommend certain transportation modes based upon calculated risk scores. If a user utilizes a recommended transportation mode, the user may earn real or imaginary credits/rewards. For example, the ODI server may challenge users to ride a DIVVY bike to work each day of the work week to receive discounts on a personal mobility policy and/or to receive "points" which could be used for benefits, such as, for example, discounts, gift cards, and the like at a later time.

Additionally or alternatively, the ODI server may be configured to create a policy (e.g., "bike policy") focused on insuring bike riders when utilizing their personal bikes. The bike policy would not only cover the standard need to cover the individual in case of injury, but would also cover the user's bike in case the bike was damaged or stolen. In particular, the ODI server may generate customized bike policies to insure expensive bikes (e.g., expensive make/model). In some embodiments, the bike policy may be an add-on that only activates when a user rides their personal bike. For example, bike coverage may be requested or purchased for certain trips a user plans to take with their personal bike.

In an exemplary embodiment, the ODI server may generate an on-demand policy that allows the user the ability to "flex" their policy from a standard automobile policy (for the periods of time they are driving their vehicle when they use the vehicle during the winter, holidays or weekends) to a combined personal mobility policy and car-sharing insurance policy when the user rents their personal vehicle to others on a peer-to-peer (P2P) car-sharing platform. This would require a "link" to the P2P car sharing platform, such as, for example, a unique user identifier associated with a user, which would enable the ODI server to be notified when the user's personal vehicle is actively listed for rent on the P2P platform.

The methods and system described herein may be implemented using computer programming or engineering techniques including computer software, firmware, hardware, or any combination or subset thereof, where the technical effect may be achieved by performing at least one of the following steps: (i) receiving, from a user computing device associated with a user, an insurance policy request for a trip from a start location to an end location, the request including trip data and a user identifier associated with the user; (ii) determining at least one transportation mode available for the trip; (iii) accessing, from the memory device, contextual data associated with the trip; (iv) assessing, based upon at least the accessed contextual data, a risk associated with the at least one transportation mode; (v) calculating, based upon the assessment, a risk score associated with the at least one transportation mode based upon at least the contextual data; (vi) generating, based upon the calculated risk score, an insurance offering associated with the at least one transportation mode; and/or (vii) transmitting the insurance offering in real time to the user computing device for purchase by the user.

The technical effect may also be achieved by performing at least one of the following steps: (viii) determining that a vehicle associated with a user is listed for rent on a peer-to-peer (P2P) car-sharing platform; (ix) receiving, from a computing device associated with the P2P car-sharing platform, vehicle listing information associated with the user, the vehicle listing information including a user identifier associated with the user; (x) retrieving, from the memory device, a user profile associated with the user identifier, the user profile including information associated with (a) a personal automobile insurance policy associated with the vehicle, and (b) a personal mobility policy associated with the user; (xi) extracting, from the user profile, a first identifier associated with the personal automobile insurance policy and a second identifier associated with the personal mobility policy; and/or (xii) automatically transmitting, to an insurance provider computing device, instructions to (a) adjust (such as adjust the price, limits, deductibles, and/or coverages of) and/or suspend the personal automobile insurance policy associated with the first identifier, and (b) activate the personal mobility policy associated with the second identifier.

At least one technical solution addressed by this computer system may include: (i) encouraging safer or risk averse travel behavior based upon dynamic insurance pricings, recommendations, and incentives; (ii) reducing the cost of providing insurance offerings (e.g., insurance products) to users who select transportation mode and/or travel routes that pose the least amount of risk; (iii) developing new and increasing sources of non-driving telematics data by encouraging alternative travel modes and/or travel routes; (iv) encouraging users to repeatedly and routinely select safer or risk averse travel choices by providing users with gamification opportunities (e.g., user-based games and challenges); and (v) enhancing user profiles by incorporating contextual data and telematics data received from various modes of transportation therein. Further, there may be additional technical problems addressed by the system.

Exemplary Computer System for Providing Full Dynamic and on-Demand Insurance

FIG. 1 depicts a schematic diagram of an exemplary computer system 100. Computer system 100 may be configured to generate dynamic and intelligent insurance offerings. In one exemplary embodiment, computer system 100 may include an on-demand insurance (ODI) server 102, one or more user computing devices 104 (which may also be referred to as "mobile devices"), third party service devices 106, transportation network company servers 108 (which may also be referred to as "ride-share servers"), peer-to-peer (P2P) car-sharing platforms 110, and/or one or more insurance providers 112.

ODI server 102 may be implemented as a server computing device with artificial intelligence and deep learning functionality. Alternatively, ODI server 102 may be implemented as any device capable of interconnecting to the Internet, including mobile computing device or "mobile device," such as a smartphone, a "phablet," tablet, wearable, smart watch, smart glasses, or other web-connectable equipment or mobile devices. ODI server 102 may be in communication with one or more user computing devices 104, third party service devices 106, transportation network company servers 108, P2P car-sharing platforms 110, and/or insurance providers 112, such as via wireless communication or data transmission over one or more radio frequency links or wireless communication channels. In the exemplary embodiment, components of computer system 100 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular telecommunications connection (e.g., a 3G, 4G, 5G, etc., connection), a cable modem, and a BLUETOOTH connection.

Computer system 100 also includes one or more database(s) 114 containing information on a variety of matters. For example, database 114 may include such information as insurance data, vehicle telematics data (e.g., acceleration, braking, cornering, speed, location, and/or other types of data), home telematics data (e.g., home usage, electricity usage, water usage, occupancy, and/or other types of data), contextual data, user profiles, risk scores, analyses and reports based upon calculated risk scores, user offerings, user responses, group definitions, game (e.g., competition) eligibility conditions, and/or any other information used, received, and/or generated by computer system 100 and/or any component thereof, including such information as described herein.

In one exemplary embodiment, database 114 may include a cloud storage device, such that information stored thereon may be securely stored but still accessed by one or more components of computer system 100, such as, for example, ODI server 102, one or more user computing devices 104, third party service devices 106, transportation network company servers 108, P2P car-sharing platforms 110, vehicles (not shown), and/or insurance providers 112. In one embodiment, database 114 may be stored on ODI server 102. In any alternative embodiment, database 114 may be stored remotely from ODI server 102 and may be non-centralized.

Computer system 100 may include a plurality of user computing devices 104 registered therewith, where each user computing device 104 is associated with at least one user who has an insurance policy associated therewith (e.g., where insurance policies are maintained by insurance provider 112). User computing devices 104 may be computers that include a web browser or a software application to enable user computing devices 104 to access the functionality of ODI server 102 using the Internet or a direct connection, such as a cellular network connection. User computing devices 104 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment.

Each user computing device 104 may be associated with a particular user, which may include an insured associated with an insurance policy offered by insurance provider 112. User computing devices 104 may include an app 116 (e.g., a telematics collection app, insurance app, and/or game app) maintained by ODI server 102, that may be downloadable from ODI server 102 so that app 116 may be executed on user computing devices 104. App 116 may include computer-executable instructions that can be executed by user computing devices 104. A user may use app 116 to request on-demand insurance for a trip, provide inputs to ODI server 102, change preferences (e.g., provide permission for ODI server 102 to receive telematics data), receive dynamic insurance offerings, participate in daily, weekly, and/or monthly challenges, view personal and/or group telematics data, view insurance policy information, view historical insurance information (e.g., a log of the most recent PMP and/or micro-mobility UBI insurance offerings purchased by the user) and perform other actions, including those described elsewhere herein.

User computing devices 104 may be configured to capture and/or generate telematics (such as vehicle telematics) and/or sensor data during operation thereof (e.g., while user computing device 104 is on or active and/or in motion). Specifically, user computing devices 104 may have one or more sensors disposed thereon, such as location sensors, audio sensors, video sensors, cameras, GPS/navigation systems, accelerometers, gyroscopes, scanners, and/or any other sensor, including those described elsewhere herein. The sensors operate and collect and/or generate telematics and/or sensor data passively and/or actively as user computing device 104 is operating. In some embodiments, the sensor data includes information captured about the respective device's motion, the environment around the device (e.g., temperature, sounds, etc.), and objects around the device. User computing device 104 may track and record location data (e.g., Global Positioning System (GPS) data), accelerometer data, and/or gyroscope data associated with user computing device 104 as the user is, for example, riding a bike or an e-scooter. ODI server 102 may receive any such data from user computing devices 104.

ODI server 102 may be configured to process telematics data and/or sensor data received from user computing devices 104, and/or data received from third party service devices 106, to generate user profiles indicative of user behavior, such as driving profiles. ODI server 102 may be further configured to leverage contextual data (which may be received from any of the above-described devices and/or accessed from database 114) to enrich the generated user profiles. ODI server 102 may then generate user-specific and context-specific on-demand insurance offerings. ODI server 102 may further generate additional user offerings, such as recommendations, incentives, and the like, to affect or influence user behavior (e.g., to reduce risk, reduce user costs, generate additional or alternative vehicle and/or home telematics data, incorporate different travel modes, etc.).

Third party service devices 106 may refer generally to computing devices associated with third party services that provide external sources of data, such as sources of contextual data. ODI server 102 may request, receive, and/or otherwise access data from third party service devices 106. Third party service devices 106 may include, for example, the National Weather Service, the National Highway Traffic Safety Administration (NHTSA), and/or the U.S. Department of Transportation. ODI server 102 may be configured to process data received from third party service devices 106 to analyze travel conditions, traffic volume, road closures, and weather/road conditions when generating user offerings, such as on-demand insurance offerings. Third party service devices 106 may be any devices capable of interconnecting to the Internet, including a server computing device, a mobile computing device or "mobile device," such as a smartphone, wearable, or other web-connectable equipment or mobile devices.

Transportation network company (TNC) servers 108 may refer generally to servers associated with transportation network company services, such as UBER and LYFT that enable transportation of passengers by allowing independent operators the ability to offer transportation services to riders seeking transportation. TNC servers 108 may be associated with scooter sharing and bike sharing services.

ODI server 102 may request, receive, and/or otherwise be in communication with TNC servers 108. ODI server 102 may receive data from TNC servers 108 to analyze the supply and demand for rides. ODI server 102 may also receive, from TNC servers 108, data associated with a ride requested by the user. In some embodiments, ODI server 102 may transmit, to TNC servers 108, data associated with an on-demand insurance offering purchased by the user for a ride requested through a transportation network company service. In certain embodiments, on-demand insurance offerings may be offered via TNC servers 108.

In the exemplary embodiment, ODI server 102 provides the user with one or more on-demand insurance offerings via user computing device 104. The user may use user computing device 104 to select an on-demand insurance offering for a ride requested through a transportation network company service, and to purchase the selected on-demand insurance offering and transmit payment to ODI server 102. ODI server 102 may transmit the funds to insurance provider 112 with instructions to initiate insurance coverage.

Insurance provider 112 may be associated with and/or maintained by an insurance provider, which provides insurance policies associated with users, vehicles, and the like. Insurance provider 112 may communicate with ODI server 102, user computing device(s) 104, and/or database 114 in order to transmit and/or receive information associated with the insurance policies. For example, insurance provider 112 may transmit insurance policies to ODI server 102, and/or may receive or access user profiles, user offerings, responses to user offerings, and the like.

In some embodiments, ODI server 102 may determine one or more optimal insurance offerings to provide insurance coverage to a user. For example, ODI server 102 may determine on-demand insurance offerings for a particular trip from a first location to a second location using various modes of transportation, such as utilizing public transportation, a transportation network company service, and walking. In these embodiments, ODI server 102 may transmit each of the determined on-demand insurance offerings to insurance provider 112 and request authorization to offer the determined offers to a user.

Peer-to-peer (P2P) car-sharing platforms 110 may refer generally to computing devices and/or servers associated with car-sharing platforms or marketplaces, such as TURO and GETAROUND that enable a user to list their personal vehicle for rent. ODI server 102 may request, receive, and/or otherwise be in communication with P2P car-sharing platforms 110 to determine when and for how long a user's personal vehicle is listed on one or more P2P car-sharing platforms 110. ODI server 102 may receive data from P2P car-sharing platforms 110 including, vehicle listing information and a user identifier associated with the user to determine whether the user's (i) personal automobile insurance policy needs to be suspended and/or otherwise adjusted (such as adjust the price, limits, deductibles, and/or coverages of), and/or (ii) PMP and/or micro-mobility insurance policy needs to be activated and/or otherwise adjusted (such as adjust the price, limits, deductibles, and/or coverages of) during the time period that the user's vehicle is actively listed on P2P car-sharing platform 110. ODI server 102 may be in communication with P2P car-sharing platforms 110 to analyze vehicle listing information, and enable a user to switch between different insurance policies to better accommodate and adapt to the user's specific driving situation (e.g., renting out a personal vehicle vs. using the personal vehicle).

In the exemplary embodiment, third party service devices 106 and/or insurance provider 112 may be a source of eligibility conditions for one or more incentives, as described herein, such as those associated with group telematics data competitions. Third party service devices 106 and/or insurance provider 112 may, in some cases, desire additional telematics data associated with a particular travel mode, and may therefore initiate a competition, such as a weekly challenge, for an incentive (e.g., decreased insurance premium, a discount, a gift card) based upon an eligibility condition requiring users to participate in that transportation mode. Eligibility conditions may be selected and/or defined for any purpose and with any characteristics. ODI server 102 may receive eligibility conditions form third party service devices 106 and/or insurance provider 112 and may compare telematics data to those eligibility conditions to determine which user or users quality to compete for a particular incentive and, thereafter, which user or users won the incentive.

Exemplary Process for Generating Risk Scores

Figure 2:
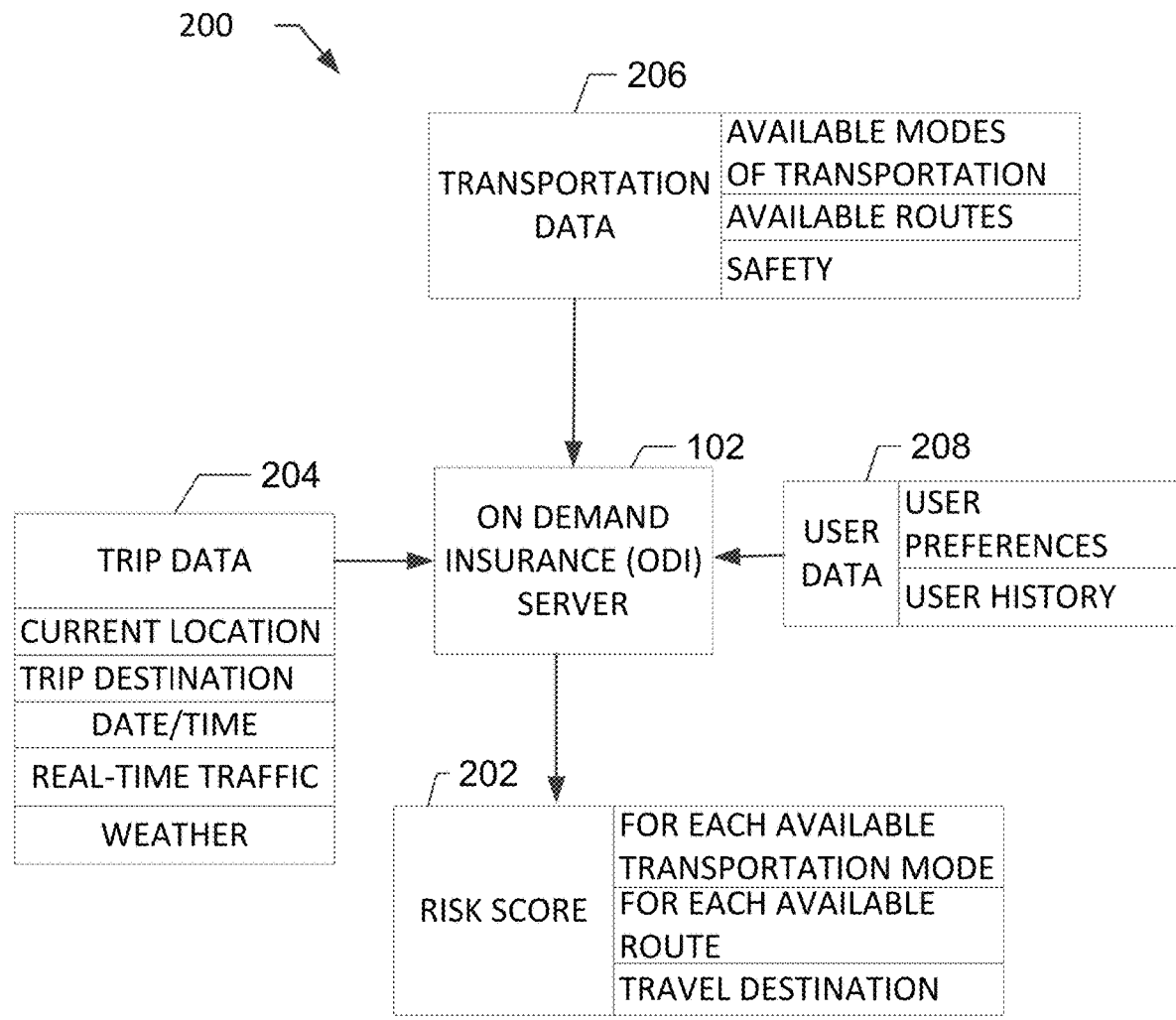
FIG. 2 illustrates a simplified block diagram of an exemplary process for generating risk scores using the computer system shown in FIG. 1.

FIG. 2 is a simplified block diagram 200 of an exemplary process for generating a risk score 202 using computer system 100 (shown in in FIG. 1). In the exemplary embodiment, diagram 200 includes on-demand insurance (ODI) server 102, trip data 204, transportation data 206, and user data 208. In the exemplary embodiment, ODI server 102 may be configured to generate a risk score 202 for each transportation mode and route available to a requesting user for a given trip. ODI server 102 may also be configured to generate a risk score 202 associated with a travel destination (e.g., end destination) associated with a given trip.

In some embodiments, ODI server 102 may generate one risk score 202 for each trip a user requests insurance coverage. In these embodiments, the one risk score 202 encompasses the risk associated with the available transportation modes, available routes, and designated travel destination. Risk scores 202 may be calculated by ODI server 102 to generate dynamic pricing models based upon a risk associated with a particular transportation mode and travel route. These dynamic pricing models may be utilized to calculate and provide insurance offerings that more accurately reflect the associated risk to the user. Additionally or alternatively, the dynamic pricing models may be utilized to generate user recommendations to encourage safe travel and transportation decisions.

For example, a high risk score 202 may indicate that a given transportation mode or travel route poses a high risk to the user, and a low risk score 202 may indicate a low risk to the user. Calculated risk scores may be compared to a corresponding threshold value associated with an average level of risk for a given transportation mode or travel route. Risk scores that are above the threshold value may be categorized as high risk (e.g., high level of risk to the user) transportation modes. Risk scores that are below the threshold value may be categorized as low risk (e.g., low level of risk to the user). ODI server 102 may offer insurance coverage for less risky transportation modes and travel routes at a lower price, such as to incentivize risk averse behavior. In some embodiments, ODI server 102 may be configured to provide insurance discounts for transportation modes and/or travel routes that are associated with a low risk to encourage users to make safer transportation choices.

In further embodiments, ODI server 102 may be configured to generate user recommendations for one or more transportation modes and/or travel routes based upon the calculated risk scores 202. For example, ODI server 102 may encourage a user to select an insurance offering for one transportation mode, such as, for example, a ride-sharing service over another insurance offering for a different transportation mode, such as, for example, riding an electric scooter, because it is 11 PM at night, the user's end destination is over 15 miles away from the user's current location, and ODI server 102 determines that a greater risk is associated with the user riding an electric scooter alone for over 15 miles at night.

Trip data 204 includes a current location (e.g., start location) and a trip destination (e.g., end location, end destination) of the trip received from a user's user computing device 104 (shown in FIG. 1). Trip data 204 may further include information as to a date and time associated with the user's request for insurance coverage. Trip data 204 may further include real-time traffic information along one or more available routes from the user's current location to the designated end location, and weather information regarding inclement weather for one or more available routes.

In some embodiments, weather information includes a weather forecast for a given zip code or region (e.g., county, city) associated with the current location and/or the designated end location. Weather information may include the weather forecast in the user's current location, in the designated end location near the expected arrival time, and/or in between the user's current location and end location. Weather data may be received from user computing devices 104 and/or third party service devices 106, such as, for example, a local or national weather service (both shown in FIG. 1). Additionally or alternatively, trip data 204 may include an estimated time of arrival (ETA) and navigation data.

Transportation data 206 includes transportation modes and transportation routes available to a user at the time of requesting insurance coverage from ODI server 102. In embodiments where a user is planning ahead for an upcoming trip, ODI server 102 is configured to retrieve transportation modes and routes available to the user based upon the upcoming trip information (e.g., date and time) received from the user. For example, if a user is planning for a trip back home from a concert that ends around 11 PM on a weekday, ODI server 102 may determine, for example, that certain modes of public transportation, such as the subway, are not available to the user when the concert ends. In this example, ODI server 102 may be configured to exclude the subway as a viable transportation option when calculating insurance offering prices for the user.

Transportation data 206 further may include safety information with respect to each transportation mode and route available to a user for a given trip. Safety information may include accident data for various transportation modes and routes, such as road traffic injuries (e.g., car crashes, fatalities), road condition data (e.g., local roads, highways, rural roads, road debris), pedestrian safety reports as well as safety reports generally associated with available transportation modes, such as, for example, the local bus, metro, subway, and ride-sharing services. ODI server 102 may receive transportation data 206 from user computing devices 104 (e.g., telematics data), third party service devices 106, such as the National Highway Traffic Safety Administration (NHTSA), and/or transportation network company servers 108 (all shown in FIG. 1).

User data 208 may include user preferences indicated by the user, as well as the user's mobility history. The user's mobility history may include information regarding past requests made by the user for PMP and/or micro-mobility insurance coverage. For example, ODI server 102 may be configured to analyze the user's request history to determine where the user typically travels to, how often the user travels, and the transportation modes frequently utilized by the user. Based upon this analysis, ODI server 102 may be configured to build a user profile associated with the user.

The user profile may include information, such as, for example, the frequently visited locations, the most recent locations visited by the user, the user's purchase history with respect to insurance policies, the risk score associated with the frequented locations, trip route, and/or transportation mode, and/or the date and time of each request. User profiles may be stored in database 114 (shown in FIG. 1).

Based upon the user profile, ODI server 102 may determine whether the user typically selects modes of transportation, travel routes, and/or end destinations that are associated with a low or high risk to the user. ODI server 102 may utilize user data 208 in determining the pricing for insurance offerings. In further embodiments, the user may indicate a specific transportation mode, transportation company and/or service, or travel route that the user prefers to use. In these embodiments, ODI server 102 may be configured to prioritize the user's preferences when generating travel recommendations to the user. ODI server 102 may retrieve user data 208 from database 114.

Exemplary Process for Providing on-Demand Insurance

Figure 3:
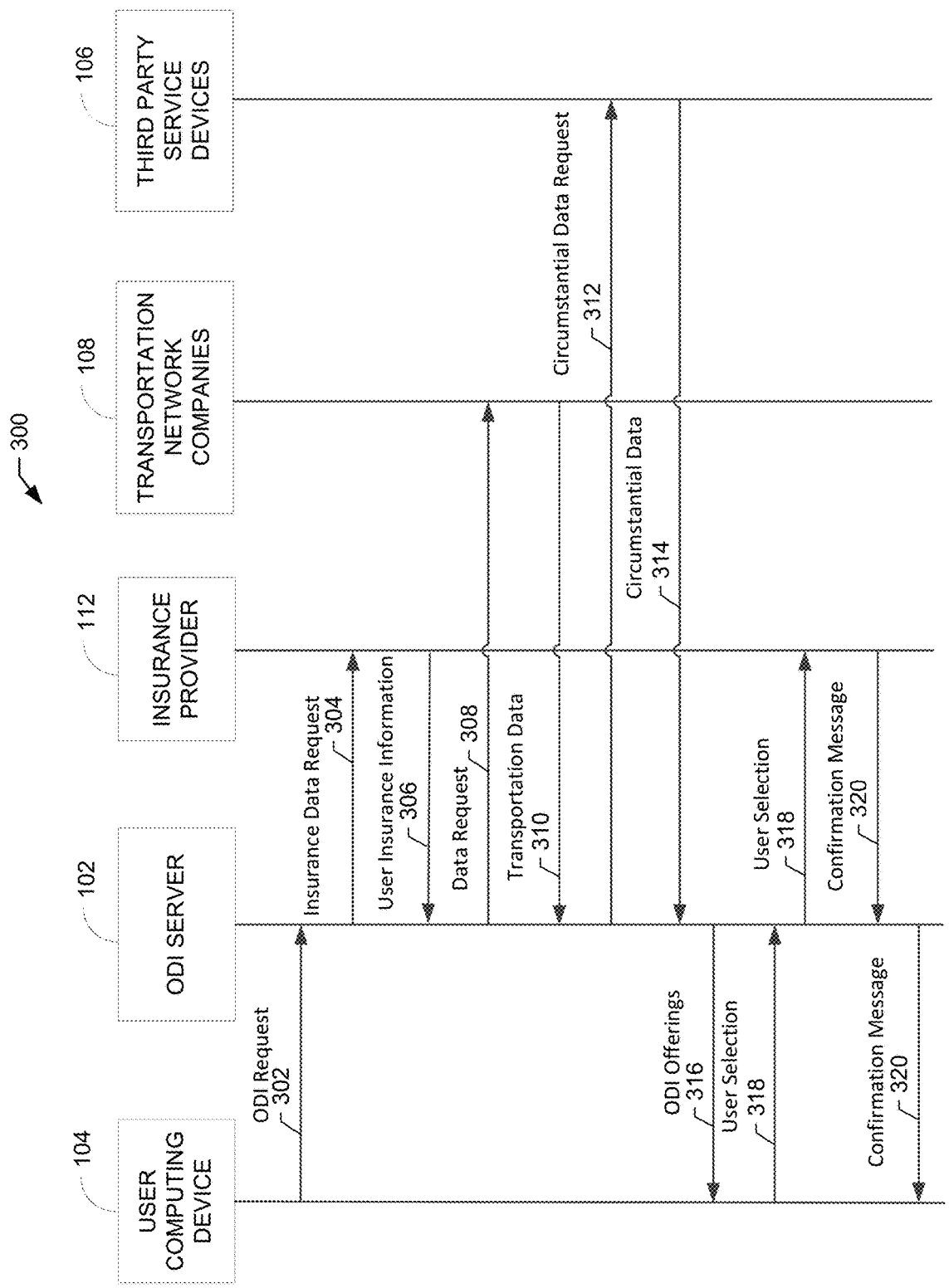
FIG. 3 depicts a data flow diagram illustrating an exemplary flow of data for providing on-demand insurance to a user using the computer system shown in FIG. 1.

FIG. 3 depicts a data flow diagram illustrating an example process 300 for providing on-demand insurance to a user (associated with user computing device 104). Process 300 may be carried out by computer system 100 (shown in FIG. 1).

In the exemplary embodiment, a user associated with user computing device 104 may transmit an on-demand insurance (ODI) request 302 to ODI server 102. The user may transmit ODI request 302 when the user is scheduling an upcoming trip. For example, the user may transmit ODI request 302 via user computing device 104 to ODI server 102 when the user is scheduling a ride via a ride-sharing service or trying to decide which mode of transportation to choose for an upcoming trip. ODI request 302 may include a user identifier associated with the user, a device identifier (e.g., device ID) associated with user computing device 104, a time stamp (e.g., date and time) associated with ODI request 302, a date and time for the requested trip insurance coverage, a start location associated with the trip coverage, an end location (e.g., destination) associated with the trip coverage, and location data associated with user computing device 104 at the time of transmitting ODI request 302 (e.g., geographic coordinates, geographic area, zip code).

In some embodiments, the start location may be the same location as the current location data associated with user computing device 104. In further embodiments, the start location may be different from the current location of user computing device 104. For example, the user may request a micro-mobility insurance policy from the train station to the user's home while the user is riding the train.

ODI server 102 may be configured to retrieve a user profile associated with the user based upon ODI request 302 received from user computing device 104. ODI server 102 may utilize a user identifier provided in ODI request 302 to identify and retrieve a user profile associated with the user from database 114 (shown in FIG. 1). The user profile may include information including the user's past trips, associated insurance coverage purchases, user preferences, and/or one or more risk scores associated with the user's trips.

In the exemplary embodiment, ODI server 102 may transmit an insurance data request 304 to insurance provider 112. Based upon the information provided in ODI request 302, ODI server 102 may request insurance provider 112 to provide various policy and/or pricing information. Insurance provider 112 may transmit requested insurance information 306 to ODI server 102 in return. ODI server 102 may also transmit a data request 308 to one or more transportation network company servers 108, requesting information regarding available transportation options during the date and time frame identified in ODI request 302. Transportation network company servers 108 may transmit requested transportation data 310 to ODI server 102 in return.

ODI server 102 may further transmit a circumstantial data request 312 to one or more third party service devices 106, requesting circumstantial data regarding the upcoming trip identified in ODI request 302. Circumstantial data requested by ODI server 102 may include, but is not limited to, weather data, accident data, traffic data, safety data associated with available modes of transportation, and/or road closure information. Third party service devices may transmit requested circumstantial data 314 to ODI server 102 in return.

In the exemplary embodiment, ODI server 102 may be configured to generate one or more on-demand insurance (ODI) offerings 316 based upon the retrieved user profile, as well as the requested transportation data, circumstantial data, and the insurance information. ODI server 102 may calculate one or more risk scores associated with the transportation modes and/or routes available to the user based upon the transportation data and circumstantial data received from transportation network company servers 108 and third party service devices.

ODI server 102 may apply machine learning and/or artificial intelligence algorithms to generate an optimal pricing model (not shown). The optimal pricing model may be executed to determine an ODI offering (e.g., insurance product offering) for each transportation mode and/or transportation route based upon an associated risk score. In certain embodiments, the optimal pricing model may be executed to determine which available transportation mode and/or transportation route poses the least amount of risk to the user, and subsequently generate a recommendation that the user purchase an ODI offering that corresponds to the least amount of risk to the user.

In the exemplary embodiment, ODI server 102 may provide one or more ODI offerings 316 to the user. ODI server 102 may prompt the user to select (e.g., through a user interface and/or an application associated with ODI server 102) one of ODI offerings 316. In certain embodiments, ODI server 102 may indicate which of ODI offerings 316 is associated with the least amount of risk to the user. Additionally or alternatively, ODI server 102 may indicate which of ODI offerings 316 are associated with a medium amount of risk and a high amount of risk to the user. User computing device 104 transmits a user selection 318 of one of ODI offerings 316 to ODI server 102. ODI server 102 may store the selected ODI offering 318 in database 114 associated with ODI server 102. ODI server 102 may further transmit user selection 318 to insurance provider 112 to notify insurance provider 112 of the selected insurance coverage.

In return, insurance provider 112 may transmit a confirmation message 320 to ODI server 102. Confirmation message 320 may acknowledge the purchase of the selected ODI offering 318 and confirm that purchased ODI offering will be effective during the trip indicated in ODI request 302 (e.g., "user identifier ABC has successfully purchased micro-mobility insurance for a trip from location A to location B on X date; mode of transportation will be ride-sharing service Y"). ODI server 102 may transmit confirmation message 320 to user computing device 104. In embodiments where the user has elected to utilize a transportation option provided by a transportation network company, ODI server 102 may transmit a notification message (not shown) to transportation network company server 108, notifying transportation network company server 108 that the user is insured for an upcoming trip. In further embodiments, the user, rather than ODI server 102 may directly transmit a notification message to transportation network company server 108 via user computing device 104.

Exemplary on-Demand Insurance App

In the exemplary embodiment, on-demand (ODI) server 102 may also maintain a software application or "app" 116 that enables users to purchase insurance offerings in real time, or near real time, and track various metrics associated with their behavior (e.g., transportation modes used, transportation routes used (e.g., past trips), insurance purchase history), adjust user settings, and access a plurality of services associated with computer system 100, including competing in daily, weekly, and/or monthly competitions to earn incentives and rewards. App 116 may be executed on user computing devices 104. In certain embodiments, app 116 may be executed on in-vehicle computing devices (not shown) and/or merchant terminals (not shown), such as, information stations or kiosks. For example, a user at a train station may purchase an insurance offering for an upcoming train ride at a kiosk in the train station.

FIGS. 4-9 depict exemplary screen captures or "screenshots" of a user interface of app 116 as executed on user computing device 104 (shown in FIG. 1). The example screenshots include various features and functionalities of app 116. In particular, ODI server 102 causes to be displayed in real time, at least on-demand insurance (ODI) offerings at user computing device 104, specifically via app 116, in response to a user request for insurance coverage.

Figure 4:
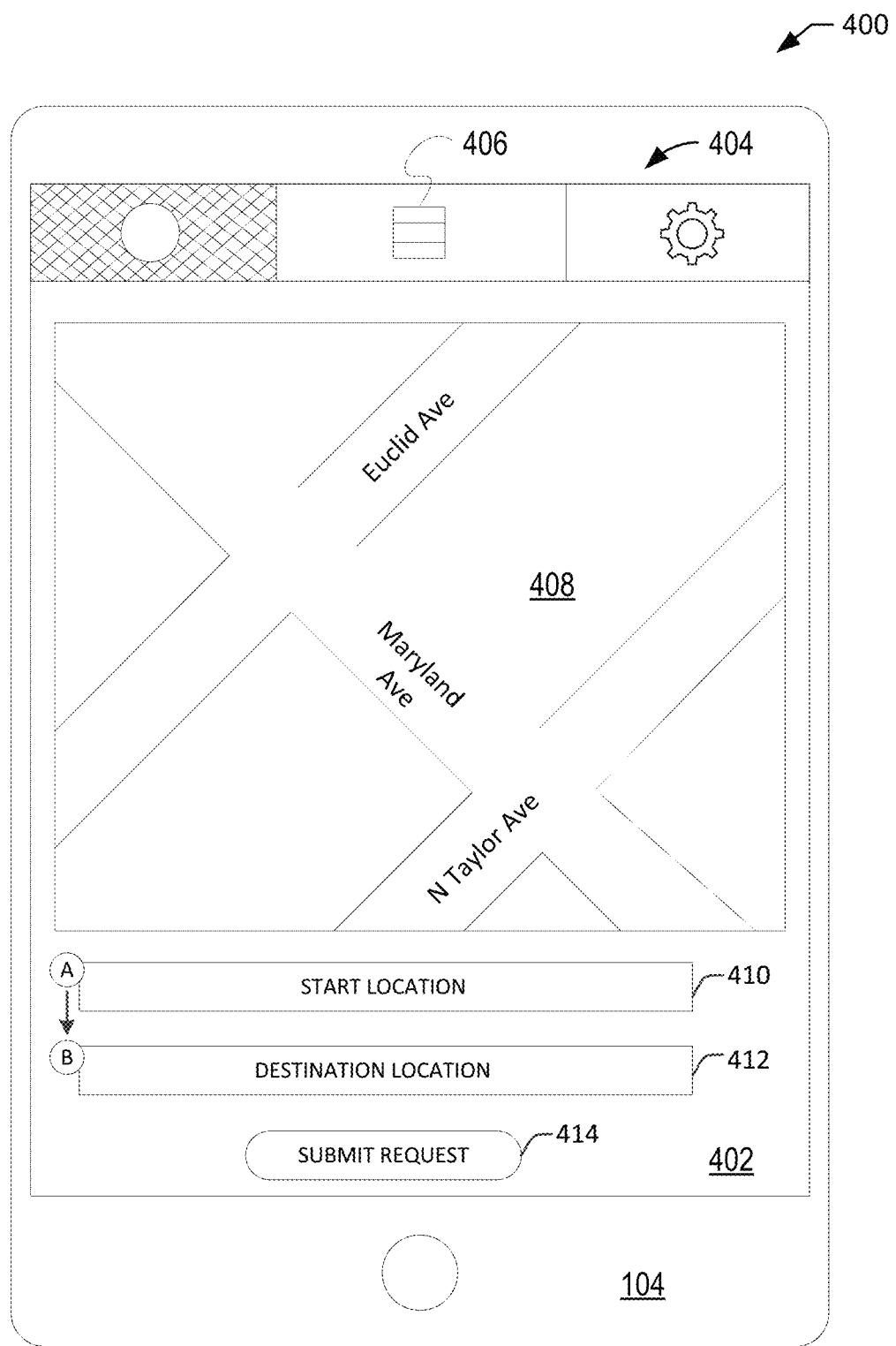
FIGS. 4-9 depict exemplary screen captures of an on-demand insurance (ODI) application ("app") maintained using the computer system shown in FIG. 1.

More specifically, FIG. 4 depicts an exemplary screenshot 400 of a first page 402 accessed by a user within the user interface of app 116. First page 402 may display a menu 404 of icons 406 that may be selected by the user to access different sections, pages, and/or functionalities of app 116. In the illustrated embodiment, menu 404 may include icons 406 associated with insurance offerings requests (represented as a circle), games (e.g., competitions) (represented as a lined box), and settings (represented as a gear). It should be readily understood that menu 404 may include additional, fewer, and/or alternative icons 406 that may represent additional, fewer, and/or alternative sections, pages, and/or functionality within app 116.

In the illustrated embodiment, the user has selected icon 406 associated with insurance offerings requests (represented as a circle) to display first page 402. First page 402 displays a first map 408. First map 408 may display a current location of the user's user computing device 104. First page 402 also displays a start location input field 410 and a destination location input field 412.

Start location input field 410 may be populated with the detected current location of user computing device 104. In further embodiments, user may manually input the location from which the user's trip will commence. For example, if a user is requesting a micro-mobility insurance offering, the user may specify the exact location from which the user would like insurance coverage to begin. The user may utilize destination location input field 412 to input an end location at which the requested insurance coverage for a given trip should end.

After a user defines the start location and the destination location, the user may select a "submit request" control 414 to submit a request for dynamic insurance offerings based upon the inputted locations. In further embodiments, first page 402 may also include a scheduling input field (not shown) that enables the user to specify a date and time for which the user is requesting insurance coverage for. In the exemplary embodiment, first page 402 enables a user to request dynamic insurance offerings in real time.

Figure 5:
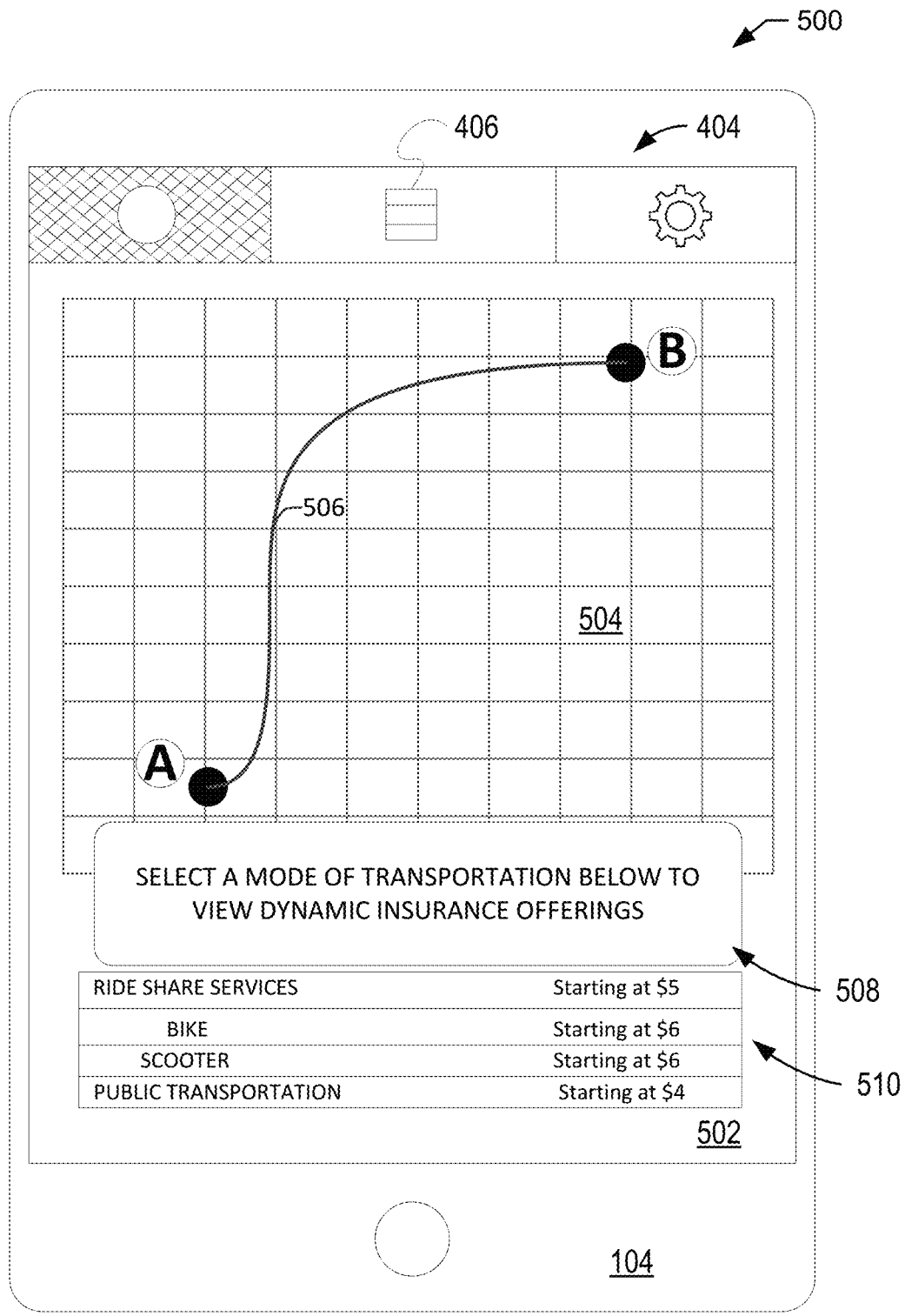

FIG. 5 depicts an exemplary screenshot 500 of a second page 502 accessed by a user within the user interface of app 116 when the user selects "submit request" control 414 (shown in FIG. 4). In the illustrated embodiment, second page 502 displays a second map 504. Second map 504 may include a route 506 from location A (e.g., start location) to location B (e.g., destination location). Second page 502 may also display a first user message 508 prompting the user to select a mode of transportation to view dynamic insurance offerings. Second page 502 may also display a first list 510 of transportation options with associated insurance offering prices. First list 510 may include insurance offerings for ride share services, bike, scooter, and public transportation. In further embodiments, first list 510 may include additional, fewer, and/or alternative transportation options based upon the transportation options available to the user for the requested date, time, and zip code.

First list 510 may also display insurance pricings associated with each category of available transportation option. As shown in FIG. 5, first list 510 may display the starting prices for insurance offerings available to the user based upon various types of transportation options. In the exemplary embodiment, the user may select one of the displayed transportation options in first list 510 to view more information regarding the insurance offerings and associated prices. For example, selecting "ride share services" from first list 510 may display a drop-down menu (not shown) of insurance offerings based upon various ride share companies (e.g., UBER, LYFT). In this example, selecting a particular ride share company may cause ODI server 102 to transmit instructions to user computing device 104 to display insurance offerings based upon the different ride sharing options the selected company has available (e.g., UBER POOL, UBER X, UBER BLACK).

In another example, selecting "bike" from first list 510 may display a drop-down menu (not shown) of insurance offerings based upon bicycle models. In this example, if the user is requesting insurance coverage for a trip via a bike that the user owns or is renting, ODI server 102 may transmit instructions to user computing device 104 to prompt the user to select the user's bike model and make from the drop-down menu. In this example, the user may be prompted to provide information regarding the condition of the user's bike. The user may be prompted to take a picture of the user's bike using user computing device 104. In the exemplary embodiment, ODI server 102 transmits instructions to user computing device 104 to display pricing information as well as insurance coverage information for each available mode of transportation. The user may select an insurance offering for purchase via user computing device 104.

Figure 6:
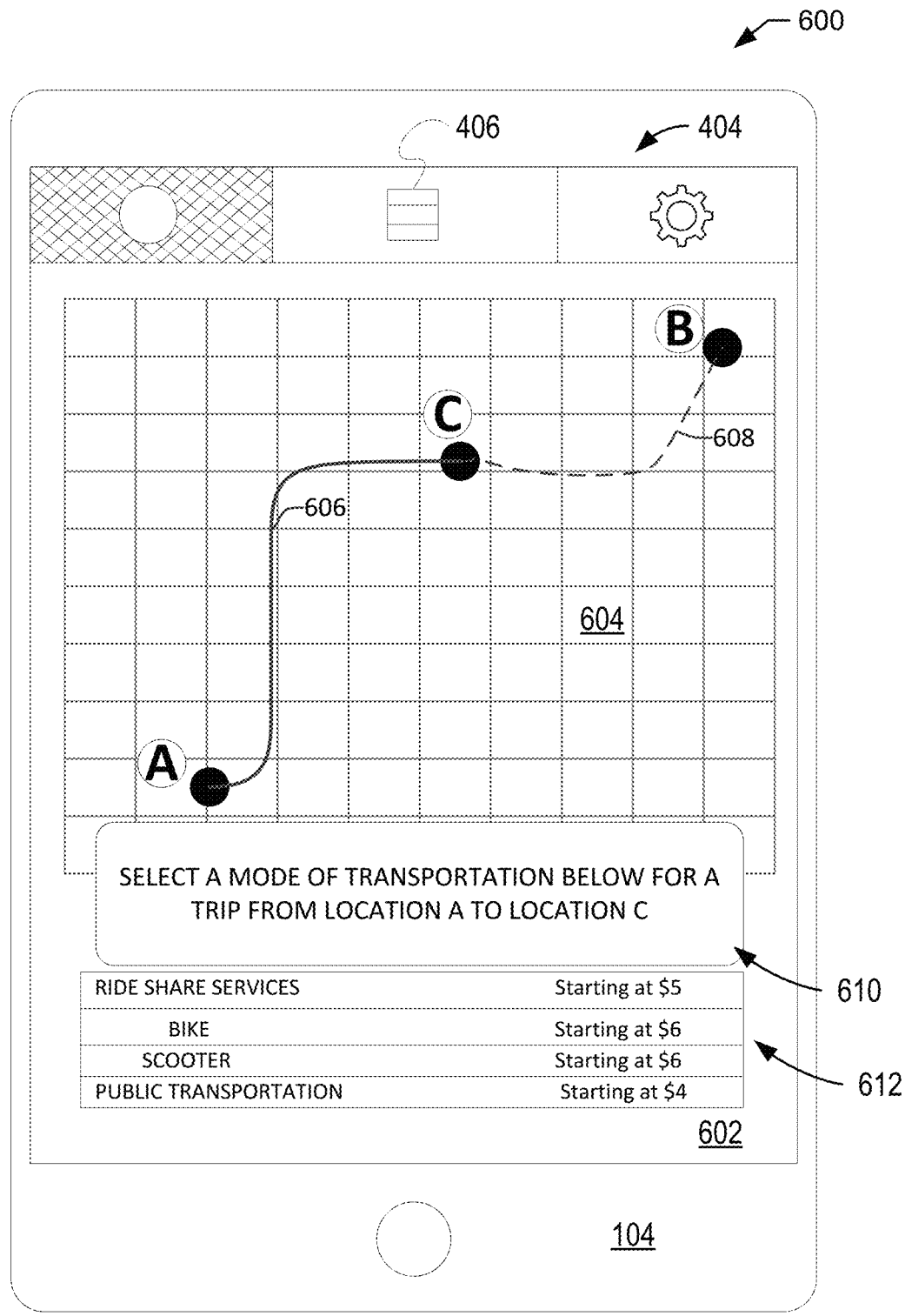

FIG. 6 depicts an exemplary screenshot 600 of a third page 602 accessed by a user within the user interface of app 116 when the user selects "submit request" control 414 (shown in FIG. 4). Third page 602 is an alternative embodiment to second page 502 of FIG. 5, where instead of requesting insurance coverage for an entire trip from location A to location B, a user requests insurance coverage for a first leg 606 of the trip, from location A to location C, as displayed in third map 604. In this embodiment, the user may input the start and destination locations of the full trip, as shown in FIG. 4, and subsequently specify that the request is for first leg 606 of the trip.

Third map 604 may display the full trip (first leg 606 and a second leg 608 of the trip) and further highlight first leg 606 to emphasize that the request is only for the highlighted part of the trip. Third page 602 may display a second user message 610 prompting the user to select a mode of transportation for a trip for first leg 606. Third page 602 may also display a second list 612 similar to first list 510 (shown in FIG. 5) that provides selectable insurance offerings based upon transportation options.

Figure 7:
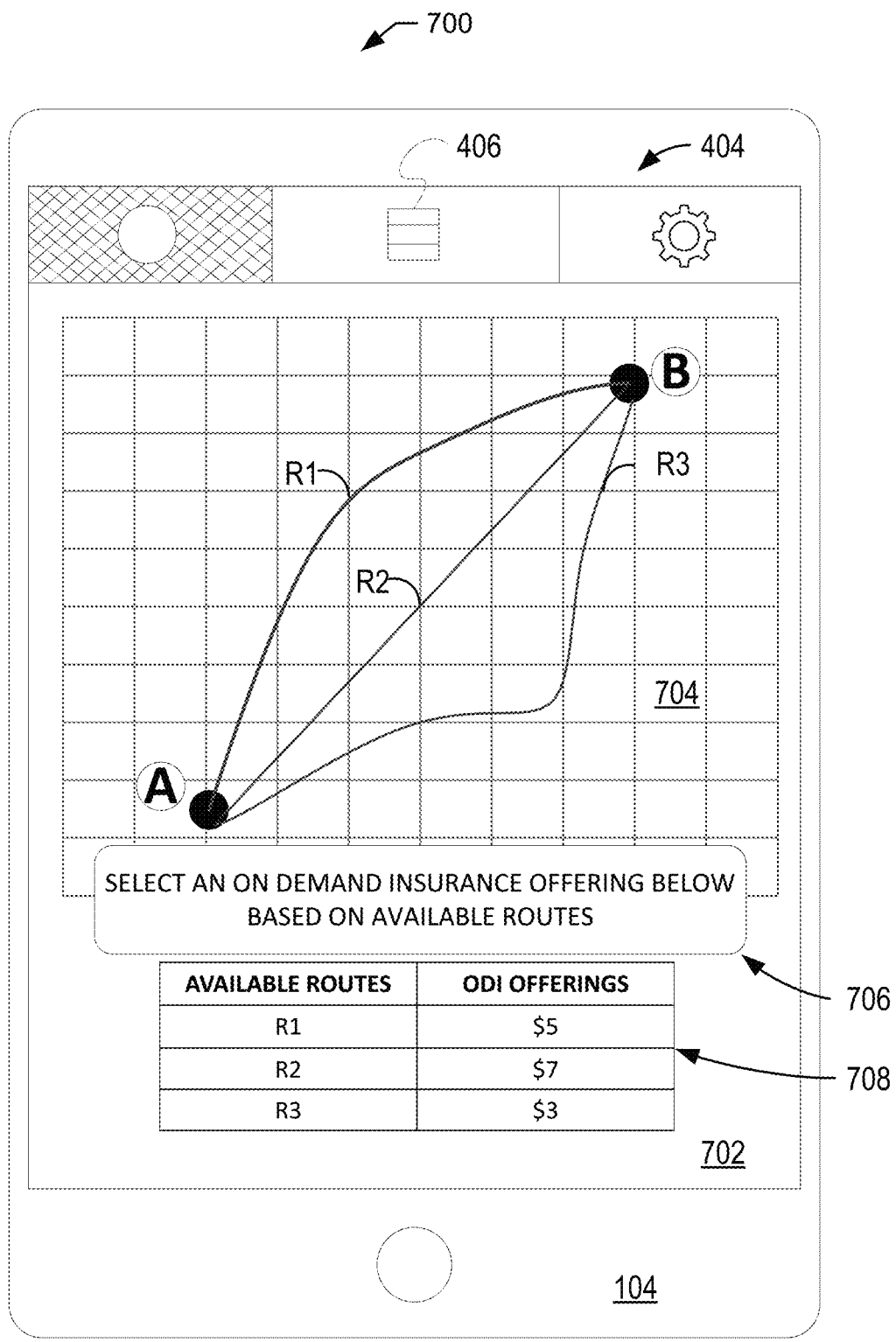

FIG. 7 depicts an exemplary screenshot 700 of a fourth page 702 accessed by a user within the user interface of app 116 when the user selects "submit request" control 414 (shown in FIG. 4). More specifically, fourth page 702 provides a user with a variety of dynamic insurance pricings based upon available routes from the user's start location to destination location. Fourth page 702 may display a plurality of available routes R1, R2, and R3 in a fourth map 704 from the user's start location (e.g., location A) to the user's destination location (e.g., location B). In the exemplary embodiment, ODI server 102 may enable a user to search for insurance offerings based upon transportation mode and travel route. Accordingly, page 702 may be displayed to a user after the user has selected a transportation mode.

Fourth page 702 may display a third user message 706 prompting the user to select an available travel route for a trip from location A to location B. Fourth page 702 may also display a third list 708 that includes insurance offerings for the available routes. Third list 708 may display the insurance pricings for each of routes R1, R2, and R3. The user may select one of the available routes displayed in third list 708 to view further information regarding the insurance offering (e.g., pricing calculation, coverage details, recommendations, level of risk associated with each route).

Each of routes R1, R2, and R3 may be associated with a different insurance coverage pricing based upon a risk score associated with each of the routes. For example, route R2 may be the most direct route to travel from location A to location B, but may also be associated with the highest level of risk because route R2 requires traveling through congested areas and busy intersections where the risk of a car accident is high. In another example, route R3 may take the user from location A to location B using backroads, but may also be associated with a low risk of a car accident. The risks associated with each available travel route may be taken into account to calculate risk scores (as shown in FIG. 2) and to provide insurance offerings at a price that most accurately reflects the associated level of risk.

Figure 8:
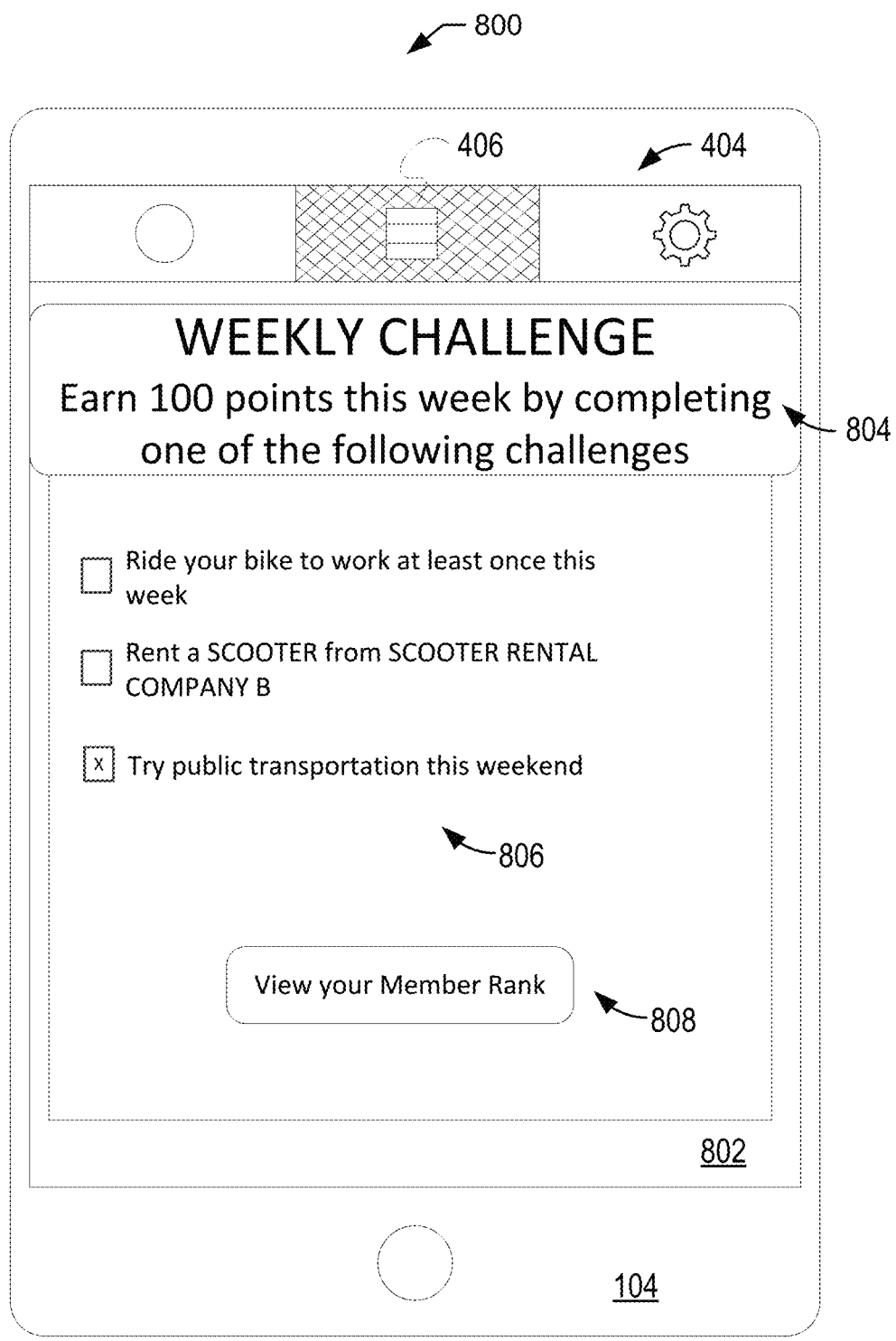
Figure 9:
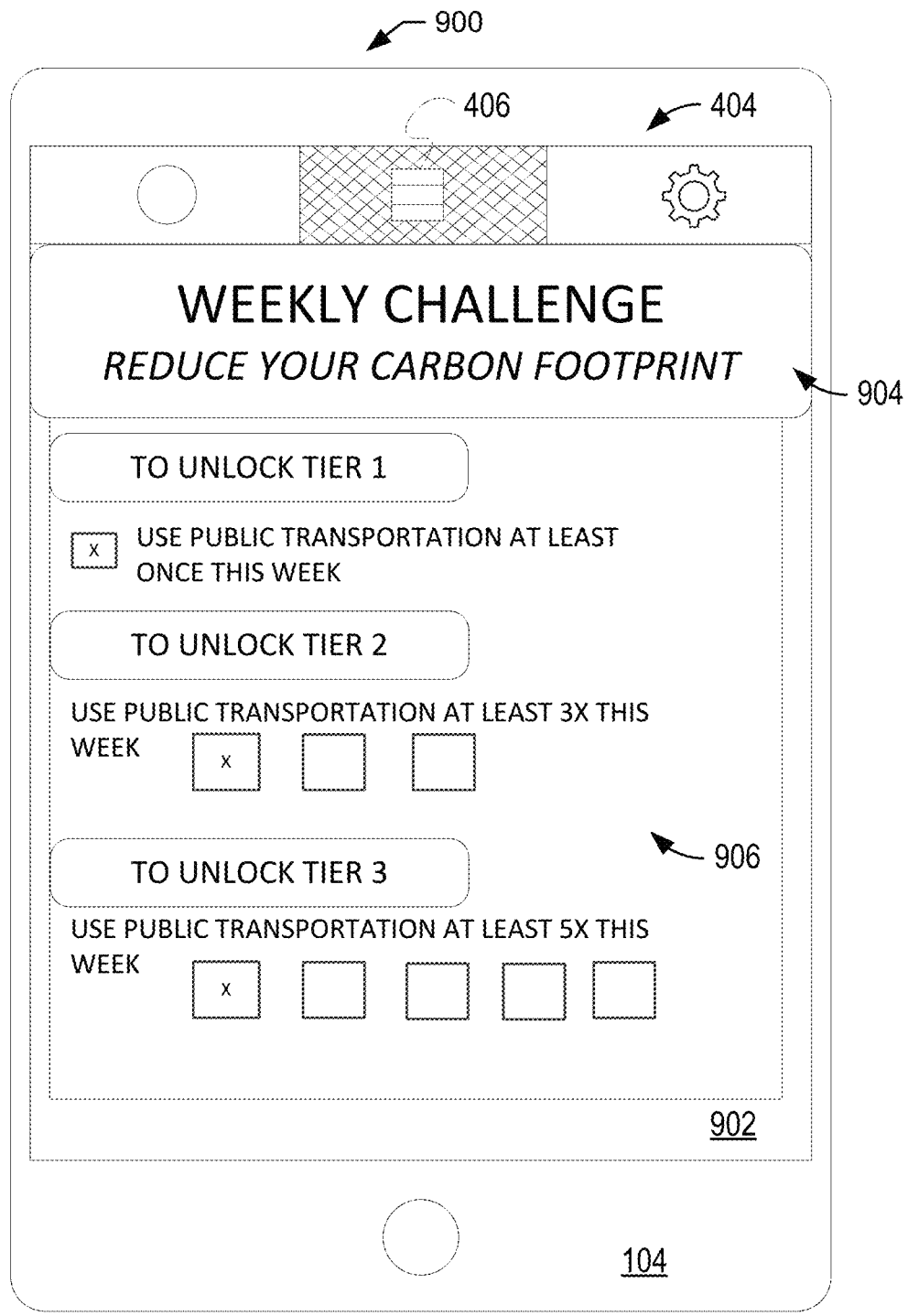

FIGS. 8 and 9 depict exemplary screenshots of gamification opportunities provided to users to encourage the use of different transportation modes based upon risk, health and/or lifestyle considerations to enhance quality of life and/or to encourage more physical activity. ODI server 102 may be configured to create user-based challenge games for individual and/or group user environments to motivate users to take different transportation methods. ODI server 102 may encourage users to utilize less risky modes of transportations through gamification opportunities.

More specifically, FIG. 8 depicts an exemplary screenshot 800 of a fifth page 802 accessed by a user within the user interface of app 116. In the illustrated embodiment, the user has selected icon 406 associated with games (e.g., competitions) (represented as a lined box). Fifth page 802 may display a first challenge offering 804, embodied as a weekly challenge to earn 100 points by completing one of the challenges listed below first challenge offering 803 in a list of eligibility conditions 806. Eligibility conditions 806 may be associated with first challenge offering 804, and provide various transportation options for the user to take to earn the incentive identified in first challenge offering 804.

Points may be accumulated to win certain incentives, such as, for example, a discount on an insurance premium, a gift card, and the like. Fifth page 802 may also include a "View your Member Rank" control 808. Selection of control 808 may cause ODI server 102 to transmit instructions to user computing device 104 to display metrics associated with the user's personal telematics data, such as a graph or "smart chart", a list of travel modes taken, a number of points earned, and the like, relative to other members of a same group. ODI server 102 may enable a user to participate in a gamification opportunity with other users as part of a group to encourage participation (e.g., competing with family and/or friends).

FIG. 9 depicts an exemplary screenshot 900 of a sixth page 902 accessed by a user within the user interface of app 116. In the illustrated embodiment, the user has selected icon 406 associated with games (e.g., competitions) (represented as a lined box). More specifically, sixth page 902 illustrates another embodiment of a gamification opportunity that may be presented to users. Sixth page 902 may include a second challenge offering 904, embodied as a weekly challenge to reduce carbon footprint. Below second challenge offering 904 are a plurality of eligibility conditions 906 associated with each tier (e.g., tier 1, tier 2, and tier 3) of second challenge offering 904. A user may "unlock" one or more tiers by accomplishing the eligibility conditions 906 associated with each tier. A user may be awarded incentives, such as points, credits, discounts, gift cards, and the like with each tier the user unlocks.

ODI server 102 may create daily, weekly, monthly, and/or yearly challenges that are customized to one or more users based upon each user's historical data and travel preferences, such as, for example, a mode of transportation frequently utilized by the user. In one embodiment, if a user usually travels to work using a ride-sharing service, ODI server 102 may provide, to the user, a gamification opportunity that rewards the user for using a transportation mode different from ride-sharing services during a work week (as shown in FIGS. 8 and 9). For example, ODI server 102 may generate a challenge offering that encourages a user to ride a Divvy bike to work for an entire week to receive a discount on an insurance offering, such as a PMP or micro-mobility UBI insurance. In the exemplary embodiment, ODI server 102 may be configured to automatically detect whether one or more eligibility conditions 906 have been met by analyzing telematics data and historical insurance purchase data received from user computing device 104.

Figure 10A:
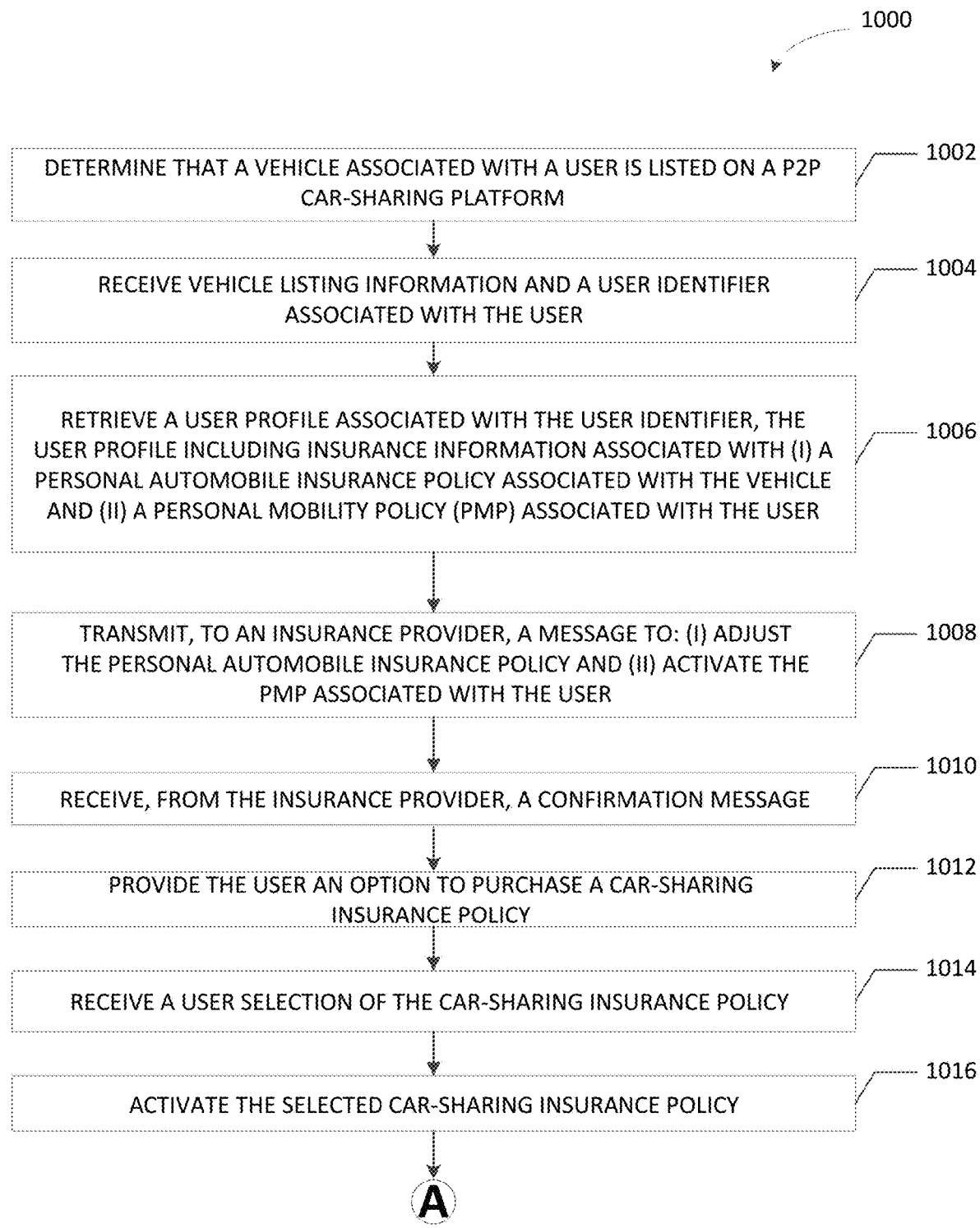
FIGS. 10A and 10B illustrate a flow chart of an exemplary computer-implemented method for enabling a user to automatically switch between insurance policies when the user's vehicle is listed on a peer-to-peer (P2P) car-sharing platform, using the computer system shown in FIG. 1.
Figure 10B:
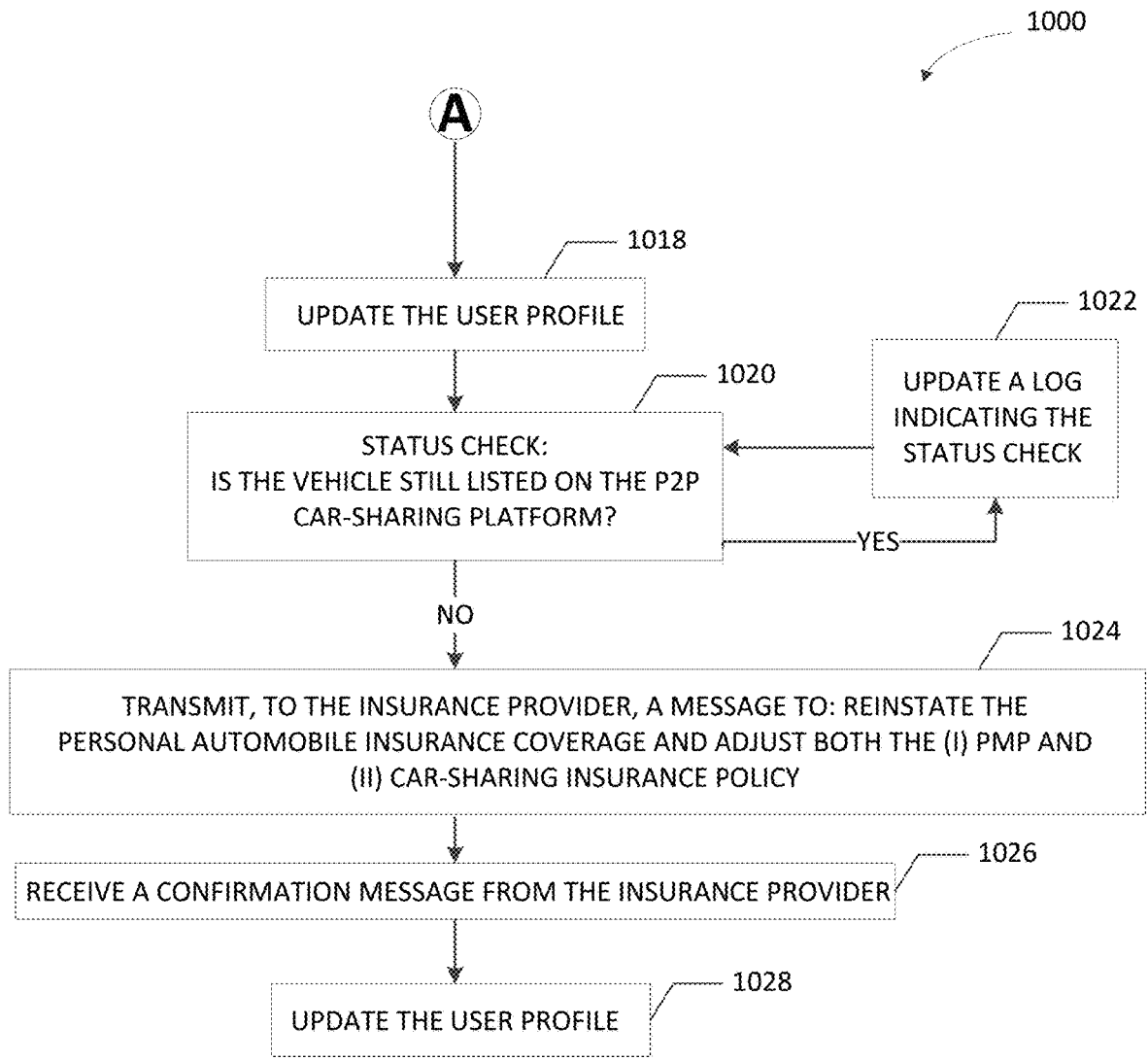

Exemplary Process for Enabling a User to "Flex" Between Insurance Policies when the User's Vehicle is Listed on a Car-Sharing Platform FIGS. 10A and 10B illustrate a flow chart of an exemplary computer-implemented process 1000 for enabling a user to automatically switch (e.g., "flex") between insurance policies when the user's vehicle is listed on a peer-to-peer (P2P) car-sharing platform 110, using computer system 100 (both shown in FIG. 1). More specifically, process 1000 may be implemented, at least in part, by a computer device/server, for example, on-demand insurance (ODI) server 102 in communication with one or more P2P car-sharing platforms 110 (shown in FIG. 1).

In the exemplary embodiment, ODI server 102 enables a user who owns a personal vehicle to "flex" their policy from a standard personal automobile policy to a personal mobility policy (PMP) and car-sharing insurance policy when the user's personal vehicle is listed on a P2P car-sharing platform. In particular, the user's personal automobile insurance policy provides standard coverage whenever the user is using their vehicle, such as, for example, during weekends, holidays, and/or seasons (e.g., seasonal use). However, during periods of time when the user is not using the vehicle, and the user's vehicle is listed for rent on a P2P car-sharing platform, the appropriate insurance coverage for the user may be a PMP and car-sharing insurance policy rather than a personal automobile insurance policy for a vehicle that the user is not driving.

Process 1000 may include determining 1002 that a vehicle associated with a user is listed on P2P car-sharing platform 110, such as, for example, TURO and GETAROUND that enable a user to list their personal vehicle for rent. In the exemplary embodiment, a user identifier associated with the user may link the user to both ODI server 102 and P2P car-sharing platform 110. In some embodiments, the user may notify ODI server 102 that he or she has listed their vehicle on a specific P2P car-sharing platform 110. In other embodiments, ODI server 102 may determine that the user's vehicle is listed on P2P car-sharing platform 110 based upon, communicating with P2P car-sharing platform 110, analyzing telematics data received from the user's user computing device 104 (shown in FIG. 1) and/or from the user's personal vehicle (not shown), and/or monitoring the user's historical insurance purchases.

For example, ODI server 102 may determine, from analyzing the user's vehicle telematics and/or home telematics data, including image data, that the user has not used his or her personal vehicle for at least a week. This may prompt ODI server 102 to transmit a request to P2P car-sharing platforms 110, inquiring whether a vehicle associated with a user identifier of the user's is currently listed for rent on P2P car-sharing platforms 110. In another example, ODI server 102 may transmit a message to user computing device 104, asking the user to confirm if the user has listed their personal vehicle for rent on P2P car-sharing platforms 110 (e.g., "we noticed that you have not driven your vehicle (model/make XYZ) over the past five days. Is your vehicle listed for rent on a car-sharing platform?").

Process 1000 may also include receiving 1004 vehicle listing information and a user identifier associated with the user. The vehicle listing information and user identifier may be transmitted by the P2P car-sharing platform 110 on which the user's personal vehicle is listed on. In other embodiments, this information may be provided by the user via user computing device 104. Vehicle listing information may include, but is not limited to, a listing date (e.g., date when the personal vehicle became actively listed for rent on P2P car-sharing platform 110), a listing termination date (e.g., date when the user is planning on taking down the listing on P2P car-sharing platform), how long the user is planning on listing his or her vehicle on P2P car-sharing platform 110, vehicle identification number (VIN), and vehicle license plate number.

Process 1000 may also include retrieving 1006 a user profile associated with the user identifier. The user profile may be stored in database 114. The user profile includes insurance information associated with (i) a personal automobile insurance policy that provides coverage for the user's personal vehicle, and (ii) a personal mobility policy (PMP) associated with the user. In the exemplary embodiment, the PMP may be inactive (e.g., does not provide coverage) when the user's personal automobile insurance policy is active (e.g., provides coverage). In some embodiments, the user may only have a personal automobile insurance policy associated with the personal vehicle. In these embodiments, upon determining that the user's personal vehicle is actively listed on P2P car-sharing platform 110, ODI server 102 may automatically prompt the user to purchase a personal mobility policy to provide immediate personal mobility coverage.

Process 1000 may also include transmitting 1008, to insurance provider 112, a message to (i) adjust and/or suspend the user's personal automobile insurance policy, and (ii) activate the PMP associated with the user. Process 1000 includes receiving 1010, from insurance provider 112, a confirmation message. The confirmation message may acknowledge receipt of the message from insurance provider 112, and may also provide information confirming that the user's personal automobile insurance policy has been suspended or otherwise adjusted, and that the user's PMP has been activated (e.g., confirmation code). For instance, collision coverage may be suspended and/or adjusted for a period of time, such as for as long as the user's personal vehicle is actively listed on the P2P car-sharing platform 110, or the personal mobility policy remains in force.

Process 1000 may also include providing 1012 the user with an option to purchase a car-sharing insurance policy. Car-sharing insurance policy, as referred to herein, may include collision, liability, and comprehensive insurance coverage in case a renter causes damage to the user's personal vehicle. In some embodiments, the user may already have car-sharing insurance policy and/or elect to purchase car-sharing insurance policy elsewhere. In the exemplary embodiment, process 1000 may also include receiving 1014 a user selection of the car-sharing insurance policy. Process 1000 further may include activating 1016 the selected car-sharing insurance policy.

Process 1000 may also include updating 1018 the user's user profile. The user profile may be updated to include the user's vehicle listing information, the information included in the confirmation message, as well as pertinent information regarding the user's car-sharing insurance policy. Process 1000 may also include performing 1020 a status check to determine if the user's personal vehicle is still listed on P2P car-sharing platform 110.

In some embodiments, ODI server 102 may transmit an update message to the user's user computing device 104, prompting the user to provide an update as to the status of their vehicle on P2P car-sharing platform 110. In other embodiments, ODI server 102 may monitor the user's personal vehicle on P2P car-sharing platform 110.

ODI server 102 may periodically transmit, to P2P car-sharing platform 110, an update request with the user's unique user identifier. If the user's personal vehicle is still listed on P2P car-sharing platform 110, process 1000 may further include updating 1022 a log indicating the status check. The log may be associated with the user. ODI server 102 may continually perform 1020 the status check until the user's vehicle has been determined to not be listed on P2P car-sharing platform 110.

When the user's vehicle is no longer listed on P2P car-sharing platform 110, process 1000 may further include transmitting 1024, to insurance provider 112, a message to reinstate and/or otherwise adjust (such as adjust the price, limits, deductibles, and/or coverages of), the user's personal automobile insurance coverage and/or suspend, and/or otherwise adjust (such as adjust the price, limits, deductibles, and/or coverages of), both the (i) PMP and (ii) car-sharing insurance policy. The message transmitted to insurance provider 112 may include the user's unique user identifier. Process 1000 may also include receiving 1026, from insurance provider 112, a confirmation message. The confirmation message may acknowledge receipt of the message to reinstate (and/or otherwise adjusted), and may include information confirming that both the (i) PMP and (ii) car-sharing insurance have been suspended, or otherwise adjusted (such as reducing the cost and/or coverages or limits of the car-sharing insurance), and that the personal automobile insurance coverage has been reinstated (and/or otherwise adjusted). Process 1000 may further include updating 1028 the user profile.

Additional Exemplary Embodiments

In an exemplary embodiment, a computer system for providing a flex insurance policy and/or adjusting a policy based upon vehicle usage and/or vehicle rental status may be provided. The computer system may include at least one processor in communication with a memory device. The computer system may be, for example, computer system 100, which includes on-demand insurance (ODI) server 102 in communication with one or more P2P car-sharing platforms 110 (all shown in FIG. 1). The at least one processor may be configured to determine that a vehicle associated with a user is listed for rent on peer-to-peer car-sharing platform 110, such as, for example, TURO and GETAROUND that enable a user to list their personal vehicle for rent. The at least one processor may be configured to determine that the user's vehicle is listed on P2P car-sharing platform 110 by utilizing a user identifier associated with the user stored in the memory device. For example, the user identifier may link the user to both ODI server 102 and P2P car-sharing platform 110.

The at least one processor may also be configured to receive, from a computing device associated with P2P car-sharing platform 110, vehicle listing information associated with the user. The vehicle listing information may include the user's user identifier. The vehicle listing information may also include a listing date (e.g., date when the personal vehicle became actively listed for rent on the P2P car-sharing platform), a listing termination date (e.g., date when the user is planning on taking down the listing on the P2P car-sharing platform), how long the user is planning on listing his or her vehicle on P2P car-sharing platform 110, a vehicle identification number (VIN), and/or a vehicle license plate number. The at least one processor may also be configured to retrieve, from the memory device, a user profile associated with the user identifier. The user profile may include information associated with a personal automobile insurance policy associated with the user's vehicle and the user's personal mobility policy.

The at least one processor may also be configured to extract, from the user profile, a first identifier associated with the personal automobile insurance policy and a second identifier associated with the personal mobility policy. The first and second identifiers may enable the at least one processor to communicate with one or more insurance providers 112 (shown in FIG. 1) associated with the user. For example, the at least one processor may be configured to automatically transmit, to insurance provider 112, instructions to adjust the user's personal automobile insurance policy. In this example, the at least one processor may transmit instructions associated with the first identifier to direct insurance provider 112 to adjust the personal automobile insurance by: lowering the price of the user's personal automobile insurance policy, increasing a discount associated with the user's personal automobile insurance policy, increasing or decreasing a deductible associated with the user's personal automobile insurance policy, reducing or adjusting comprehensive or collision coverage associated with the user's personal automobile insurance policy, reducing or adjusting one or more limits associated with the user's personal automobile insurance policy, and/or eliminating, adding, or adjusting one or more endorsements associated with the user's personal automobile insurance policy. For example, insurance endorsements (e.g., riders) may be added to the original personal automobile insurance policy to add, delete, exclude, or otherwise change the terms or scope of the coverage.

In another example, the at least one processor may transmit instructions associated with the second identifier to direct insurance provider 112 to activate or adjust the personal mobility policy associated with the second identifier. In this example, the at least one processor may transmit instructions associated with the second identifier to direct insurance provider 112 to adjust the user's personal mobility policy by: increasing the price of the user's personal mobility policy, increasing a discount associated with the user's personal mobility policy, increasing or decreasing a deductible associated with the user's personal mobility policy, reducing or adjusting comprehensive or collision coverage associated with the user's personal mobility policy, reducing or adjusting one or more limits associated with the user's personal mobility policy, and/or adding, eliminating, or adjusting one or more endorsements associated with the user's personal mobility policy.

In one aspect, a computer system for providing a flex insurance policy and/or adjusting insurance based upon vehicle usage and/or vehicle rental status may be provided. The computer system may include at least one processor and/or associated transceiver in communication with at least one memory device. The at least one processor and/or associated transceiver may be configured to: (1) determine that a vehicle associated with a user is listed for rent on a peer-to-peer (P2P) car-sharing platform; (2) receive, from a computing device associated with the P2P car-sharing platform, vehicle listing information associated with the user, the vehicle listing information including a user identifier associated with the user; retrieve, from the memory device, a user profile associated with the user identifier, the user profile including information associated with (i) a personal automobile insurance policy associated with the vehicle and (ii) a personal mobility policy associated with the user; (3) extract, from the user profile, a first identifier associated with the personal automobile insurance policy and a second identifier associated with the personal mobility policy; and/or (4) automatically transmit, to an insurance provider computing device, instructions to (i) adjust the personal automobile insurance policy associated with the first identifier, and (ii) activate or adjust the personal mobility policy associated with the second identifier. The computer system may include additional, less, or alternate functionality, including that discussed elsewhere herein.

For instance, the instructions to adjust the personal automobile insurance policy associated with the first identifier may direct the insurance provider computing device to perform one or more of: lowering the of price of the personal automobile insurance policy; increasing a discount associated with the personal automobile insurance policy; increasing or decreasing a deductible associated with the personal automobile insurance policy; reducing or adjusting comprehensive or collision coverage associated with the personal automobile insurance policy; reducing or adjusting one or more limits associated with the personal automobile insurance policy; and/or eliminating, adding, or adjusting one or more endorsements associated with the personal automobile insurance policy.

The instructions to adjust the personal mobility policy associated with the second identifier may direct the insurance provider computing device to perform one or more of: increasing the of price of the personal mobility policy; increasing a discount associated with the personal mobility policy; increasing or decreasing a deductible associated with the personal mobility policy; reducing or adjusting comprehensive or collision coverage associated with the personal mobility policy; reducing or adjusting one or more limits associated with the personal mobility policy; and/or adding, eliminating, or adjusting one or more endorsements associated with the personal mobility policy.

In another aspect, a computer-implemented method for providing a flex insurance policy and/or adjusting a policy based upon vehicle usage and/or vehicle rental status may be provided. The method may be implemented by a computer system including at least one processor and/or associated transceiver in communication with at least one memory device. The method may include, via the at least one processor and/or associated transceiver: (1) determining that a vehicle associated with a user is listed for rent on a peer-to-peer (P2P) car-sharing platform; (2) receiving, from a computing device associated with the P2P car-sharing platform, vehicle listing information associated with the user, the vehicle listing information including a user identifier associated with the user; (3) retrieving, from the memory device, a user profile associated with the user identifier, the user profile including information associated with (i) a personal automobile insurance policy associated with the vehicle and (ii) a personal mobility policy associated with the user; (4) extracting, from the user profile, a first identifier associated with the personal automobile insurance policy and a second identifier associated with the personal mobility policy; and/or (5) automatically transmitting, to an insurance provider computing device, instructions to (i) adjust the personal automobile insurance policy associated with the first identifier, and (ii) activate or adjust the personal mobility policy associated with the second identifier. The method may include additional, less, or alternate functionality, including that discussed elsewhere herein.

For instance, the instructions to adjust the personal automobile insurance policy associated with the first identifier may direct the insurance provider computing device to perform one or more of: lowering the of price of the personal automobile insurance policy; increasing a discount associated with the personal automobile insurance policy; increasing or decreasing a deductible associated with the personal automobile insurance policy; reducing or adjusting comprehensive or collision coverage associated with the personal automobile insurance policy; reducing or adjusting one or more limits associated with the personal automobile insurance policy; and/or eliminating, adding, or adjusting one or more endorsements associated with the personal automobile insurance policy.

Additionally or alternatively, the instructions to adjust the personal mobility policy associated with the second identifier may direct the insurance provider computing device to perform one or more of: increasing the of price of the personal mobility policy; increasing a discount associated with the personal mobility policy; increasing or decreasing a deductible associated with the personal mobility policy; reducing or adjusting comprehensive or collision coverage associated with the personal mobility policy; reducing or adjusting one or more limits associated with the personal mobility policy; and/or adding, eliminating, or adjusting one or more endorsements associated with the personal mobility policy.

In another aspect, a non-transitory computer-readable storage medium having computer-executable instructions embodied thereon may be provided that when executed by a computer system having at least one processor in communication with at least one memory device, the computer-executable instructions cause the at least one processor to: (1) determine that a vehicle associated with a user is listed for rent on a peer-to-peer (P2P) car-sharing platform; (2) receive, from a computing device associated with the P2P car-sharing platform, vehicle listing information associated with the user, the vehicle listing information including a user identifier associated with the user; (3) retrieve, from the memory device, a user profile associated with the user identifier, the user profile including information associated with (i) a personal automobile insurance policy associated with the vehicle and (ii) a personal mobility policy associated with the user; (4) extract, from the user profile, a first identifier associated with the personal automobile insurance policy and a second identifier associated with the personal mobility policy; and/or (5) automatically transmit, to an insurance provider computing device, instructions to (i) adjust the personal automobile insurance policy associated with the first identifier, and (ii) activate or adjust the personal mobility policy associated with the second identifier. The instructions may direct additional, less, or alternate functionality, including that discussed elsewhere herein.

For instance, the computer-executable instructions may further cause the insurance provider computing device to perform one or more of the following: lower the of price of the personal automobile insurance policy; increase a discount associated with the personal automobile insurance policy; increase or decrease a deductible associated with the personal automobile insurance policy; reduce or adjust comprehensive or collision coverage associated with the personal automobile insurance policy; reduce or adjust one or more limits associated with the personal automobile insurance policy; and/or eliminate, add, or adjust one or more endorsements associated with the personal automobile insurance policy.

The instructions to adjust the personal mobility policy associated with the second identifier may direct the insurance provider computing device to perform one or more of: increase the of price of the personal mobility policy; increase a discount associated with the personal mobility policy; increase or decrease a deductible associated with the personal mobility policy; reduce or adjust comprehensive or collision coverage associated with the personal mobility policy; reduce or adjust one or more limits associated with the personal mobility policy; and/or add, eliminate, or adjust one or more endorsements associated with the personal mobility policy.

Exemplary User Computer Device

Figure 11:
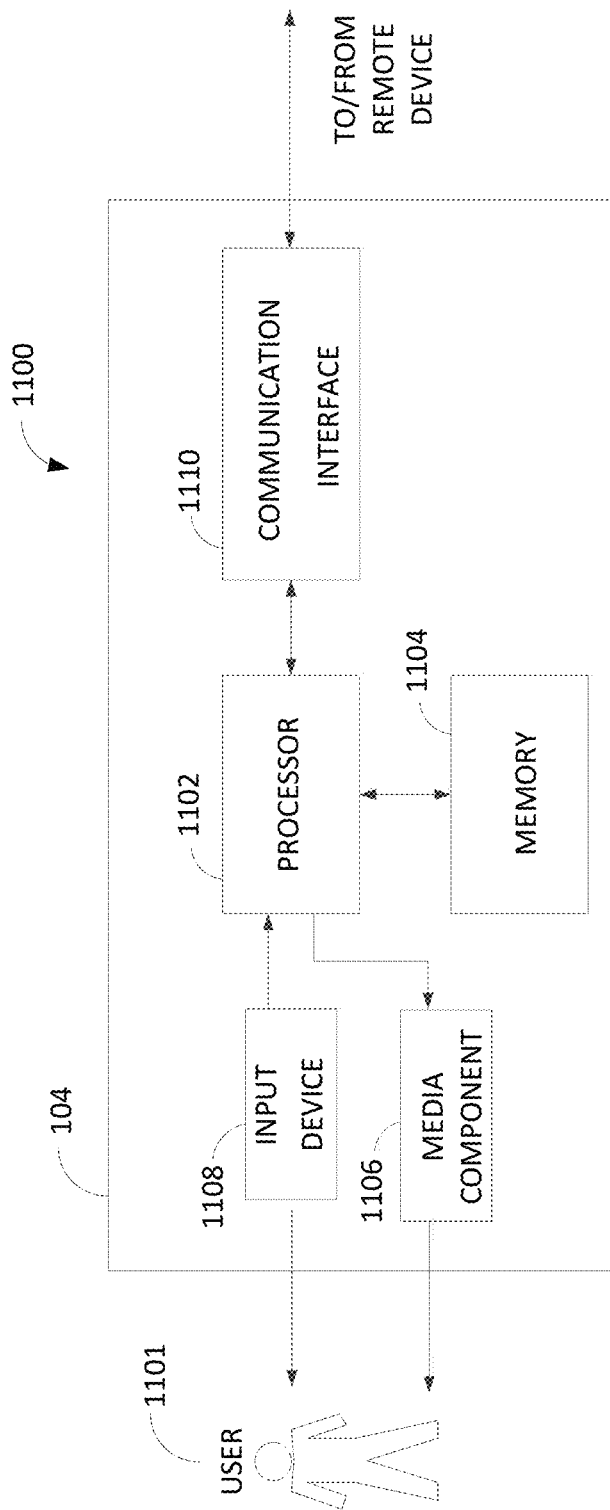
FIG. 11 is a schematic diagram of an exemplary user computing device that may be used in the computer system shown in FIG. 1.

FIG. 11 depicts an exemplary configuration 1100 of an exemplary user computer device 104 that may be used with computer system 100 (shown in FIG. 1), in accordance with one embodiment of the present disclosure. User computer device 104 may be operated by a user 1101.

User computer device 104 may include a processor 1102 for executing instructions. In some embodiments, executable instructions may be stored in a memory area 1104. Processor 1102 may include one or more processing units (e.g., in a multi-core configuration). Memory area 1104 may be any device allowing information such as executable instructions and/or transaction data to be stored and retrieved. Memory area 1104 may include one or more computer-readable media. Memory area 1104 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

User computer device 104 also may include at least one media output component 1106 for presenting information to user 1101, such as a user interface of app 116 (shown in FIG. 1) when app 116 is executed on user computing device 104. Media output component 1106 may be any component capable of conveying information to user 1101. In some embodiments, media output component 1106 may include an output adapter (not shown), such as a video adapter and/or an audio adapter. An output adapter may be operatively coupled to processor 1102 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

In some embodiments, user computer device 104 may include an input device 1108 for receiving input from user 1101. User 1101 may use input device 1108 to, without limitation, to interact with ODI server 102 (shown in FIG. 1), purchase on-demand insurance offerings, participate in games/challenges, and receive other user offerings, as described herein. Input device 1108 may include, for example, a keyboard, a pointing device, a mouse, a stylus, and/or a touch sensitive panel (e.g., a touch pad or a touch screen). A single component such as a touch screen may function as both an output device of media output component 1106 and input device 1108.

User computer device 104 may also include a communication interface 1110, communicatively coupled to a remote device such as ODI server 102. Communication interface 1110 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 1104 may be, for example, computer-readable instructions for providing a user interface to user 1101 via media output component 1106 and, optionally, receiving and processing input from input device 1108. The user interface may include, among other possibilities, a web browser and/or a client application. Web browsers enable users, such as user 1101, to display and interact with media and other information typically embedded on a web page or a website from ODI server 102. A client application (e.g., app 116) may allow user 1101 to interact with, for example, ODI server 102. For example, instructions may be stored by a cloud service and the output of the execution of the instructions sent to the media output component 1106.

Exemplary Server Device

Figure 12:
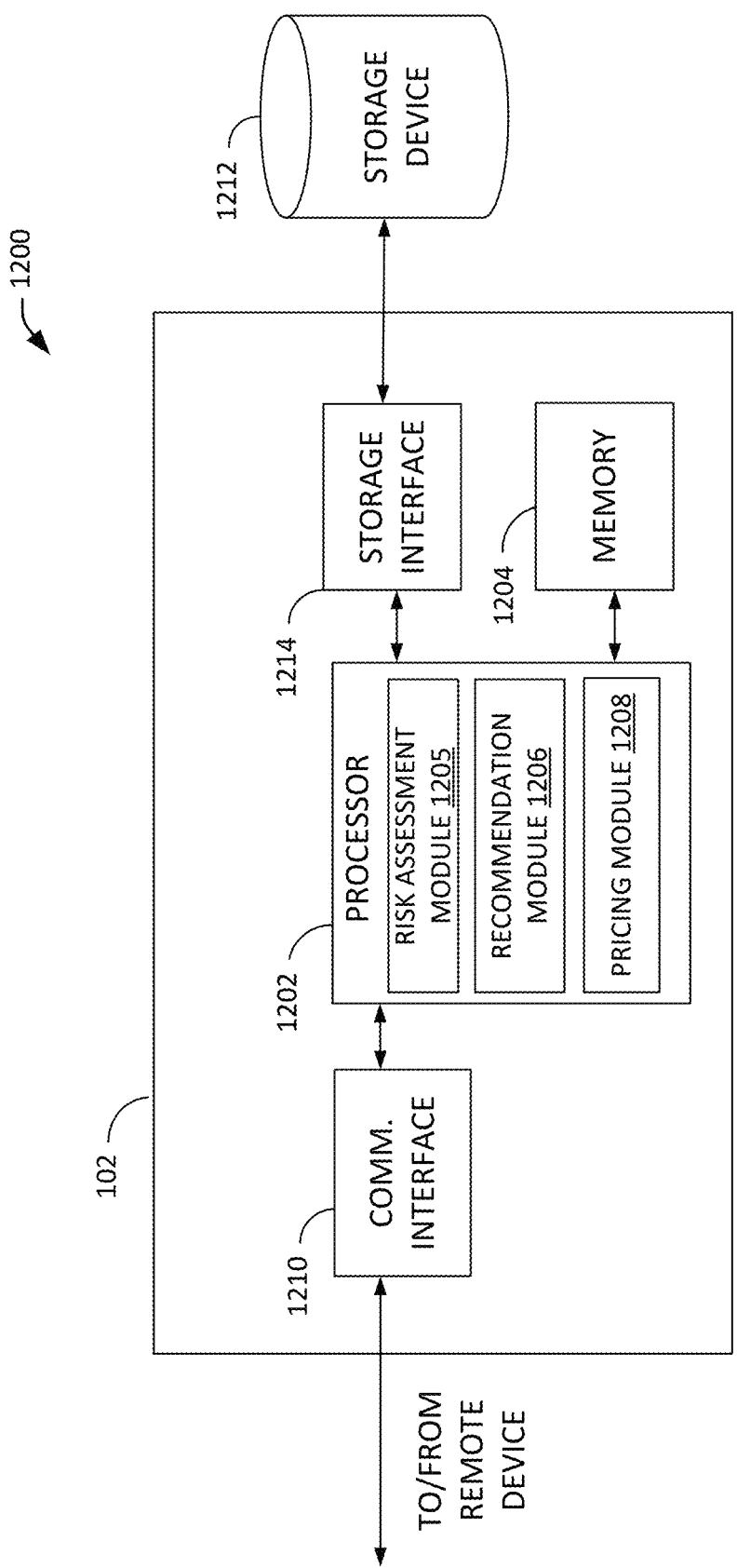
FIG. 12 is a schematic diagram of an exemplary on-demand insurance (ODI) server of the computer system shown in FIG. 1.

FIG. 12 depicts an example configuration 1200 of an on-demand insurance (ODI) server 102 of computer system 100 (shown in FIG. 1). ODI server 102 includes a processor 1202 for executing instructions. Instructions may be stored in a memory area 1204, for example. Processor 1202 may include one or more processing units (e.g., in a multi-core configuration) configured to generate dynamic insurance policies based upon the risk associated with one or more trips.

In the exemplary embodiment, processor 1202 is operable to execute modules, such as risk assessment module 1205, recommendation module 1206, and pricing module 1208. Modules 1205, 1206, and 1208 may include specialized instruction sets and/or coprocessors. In the exemplary embodiment, risk assessment module 1205 may be utilized to calculate risk scores as well as to generate analyses and reports based upon the calculated risk scores.

Recommendation module 1206 may be utilized to generate risk-based recommendations to users based upon the calculated risk scores. Recommendation module 1206 may be utilized to determine which transportation mode and/or travel route is associated with the least amount of risk, and to generate recommendations to select a travel option associated with the least amount of risk (e.g., safest travel option) to the user.

Pricing module 1208 may be utilized to apply machine learning and/or artificial intelligence algorithms to generate an optimal pricing model (not shown). The optimal pricing model may be executed to determine an ODI offering (e.g., insurance product offering) for each transportation mode and/or transportation route based upon an associated risk score. Pricing module 1208 may be utilized to generate dynamic insurance offering pricing options for a user in response to a user request for on-demand (e.g., real time) insurance.

Processor 1202 is operatively coupled to a communication interface 1210 such that ODI server 102 is capable of communicating with a remote device such as one or more user computing devices 104 (shown in FIG. 1). For example, communication interface 1210 may receive, from users, on-demand insurance requests, vehicle telematics data, home telematics data, audio and image data, sensor data, and the like.

Processor 1202 may also be operatively coupled to a storage device 1212. Storage device 1212 is any computer-operated hardware suitable for storing and/or retrieving data. For example, databases 114 (shown in FIG. 1) may be implemented on storage device 1212.

In some embodiments, storage device 1212 is integrated in ODI server 102. For example, ODI server 102 may include one or more hard disk drives as storage device 1212.

In other embodiments, storage device 1212 is external to ODI server 102 and may be accessed by a plurality of server computing devices. For example, storage device 1212 may include multiple storage units such as hard disks or solid state disks in a redundant array of inexpensive disks (RAID) configuration. Storage device 1212 may include a storage area network (SAN) and/or a network attached storage (NAS) system.

In some embodiments, processor 1202 is operatively coupled to storage device 1212 via a storage interface 1214. Storage interface 1214 is any component capable of providing processor 1202 with access to storage device 1212, such that any of modules 1205, 1206, and 1208 are capable of communicating with database 114. Storage interface 1214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1202 with access to storage device 1212.

Memory area 1204 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types.

Exemplary Embodiments & Functionality

In an exemplary embodiment, an on-demand insurance (ODI) server for generating dynamic user offerings may be provided. The ODI server may include at least one processor and/or associated transceiver in communication with a memory device. The at least one processor and/or associated transceiver may be programmed to: (i) receive, from a user computing device associated with a user, an insurance policy request for a trip from a start location to an end location. The request may include trip data and a user identifier associated with the user. The at least one processor and/or associated transceiver may also be programmed to: (ii) determine at least one transportation mode available for the trip; (iii) access, from the memory device, contextual data associated with the trip; (iv) assess, based upon at least the accessed contextual data, a risk associated with the at least one transportation mode; (v) calculate, based upon the assessment, a risk score associated with the at least one transportation mode based upon at least the contextual data; (vi) generate, based upon the calculated risk score, an insurance offering associated with the at least one transportation mode; and/or (vii) transmit the insurance offering in real time to the user computing device for purchase by the user. The on-demand insurance (ODI) server may include less, additional, and/or alternative functionality, including that described elsewhere herein.

For instance, a further enhancement may be where the contextual data includes at least one of weather data, age of the user, data associated with the start location, and data associated with the end location. Another further enhancement may be where the at least one transportation mode is one of a ride-sharing service and public transportation, and/or where the at least one processor is further programmed to calculate the risk score by (i) retrieving, from the memory device, by utilizing the user identifier, a user profile associated with the user; (ii) accessing, from the retrieved user profile, user preference data and historical insurance purchase data; and/or (iii) assessing the risk associated with the at least one transportation mode by analyzing the accessed contextual data, the user preference data, and the historical insurance purchase data.

A further enhancement may be where the insurance offering includes a price associated with the insurance offering, the price associated with the calculated risk score. Additionally or alternatively, another further enhancement may be where the at least one processor and/or associated transceiver is further programmed to: (i) determine a plurality of transportation modes available for the trip by accessing transportation data associated with the trip; (ii) calculate a risk score for each of the plurality of transportation modes; (iii) compare the risk scores of the plurality of transportation modes to one another; (iv) rank, based upon the comparison, the plurality of transportation modes based upon the calculated risk scores; (v) generate, based upon an associated rank, an insurance offering for each of the plurality of transportation modes, wherein each insurance offering includes a price corresponding to the associated rank; and/or (vi) transmit the plurality of insurance offerings to the user computing device for selection by the user.

A further enhancement may be where the at least one processor and/or associated transceiver is further programmed to (i) determine a plurality of travel routes available for the trip by accessing transportation data associated with the trip; (ii) calculate a risk score for each of the plurality of travel routes; (iii) compare the risk scores of the plurality of travel routes to one another; (iv) rank, based upon the comparison, the plurality of travel routes based upon the calculated risk scores; (v) generate, based upon an associated rank, an insurance offering for each of the plurality of travel routes, wherein each insurance offering includes a price corresponding to the associated rank; and/or (vi) transmit the plurality of insurance offerings to the user computing device for selection by the user.

A further enhancement may be where the at least one processor and/or associated transceiver is further programmed to provide a discount associated with the insurance offering when the corresponding risk score indicates that the at least one transportation mode is associated with a low level of risk to the user. Additionally or alternatively, a further enhancement may be where the at least one transportation mode is a ride via a bicycle from the start location to the end location. The at least one processor and/or associated transceiver may be further programmed to: (i) access, from the memory device, bicycle data, the bicycle data including a make and model of the bicycle to be utilized for the trip by the user; (ii) generate, based upon the accessed bicycle data and the contextual data, an insurance offering associated with the bicycle; and/or (iii) transmit the insurance offering to the user computing device for purchase by the user.

A further enhancement may be where the at least one processor is further programmed to generate an interactive user interface configured to provide a gamification opportunity to the user to encourage the user to utilize less risky forms of transportation modes. A further enhancement may be where the gamification opportunity is a weekly challenge associated with a plurality of eligibility conditions for one or more incentives.

In one exemplary embodiment, a computer-implemented method for generating dynamic user offerings may be provided. The method may be implemented by an on-demand insurance (ODI) server including at least one processor and/or associated transceiver in communication with a memory device. The method may include, via the ODI server (and/or the at least one processor and/or associated transceiver), (i) receiving, from a user computing device associated with a user, an insurance policy request for a trip from a start location to an end location. The request may include trip data and a user identifier associated with the user. The method may also include, via the ODI server (and/or the at least one processor and/or associated transceiver), (ii) determining at least one transportation mode available for the trip; (iii) accessing, from the memory device, contextual data associated with the trip; (iv) assessing, based upon at least the accessed contextual data, a risk associated with the at least one transportation mode; (v) calculating, based upon the assessment, a risk score associated with the at least one transportation mode based upon at least the contextual data; (vi) generating, based upon the calculated risk score, an insurance offering associated with the at least one transportation mode; and/or (vii) transmitting the insurance offering in real time to the user computing device for purchase by the user. The method may include fewer, additional, and/or alternative steps, include those described elsewhere herein.

In another exemplary embodiment, a non-transitory computer-readable storage medium having computer-executable instructions embodied thereon may be provided. When executed by an on-demand insurance (ODI) server having at least one processor and/or associate transceiver in communication with at least one memory device, the computer-executable instructions may cause the at least one processor and/or associated transceiver to (i) receive, from a user computing device associated with a user, an insurance policy request for a trip from a start location to an end location. The request may include trip data and a user identifier associated with the user. The instructions may cause the at least one processor and/or associated transceiver to (ii) determine at least one transportation mode available for the trip; (iii) access, from the memory device, contextual data associated with the trip; (iv) assess, based upon at least the accessed contextual data, a risk associated with the at least one transportation mode; (v) calculate, based upon the assessment, a risk score associated with the at least one transportation mode based upon at least the contextual data; (vi) generate, based upon the calculated risk score, an insurance offering associated with the at least one transportation mode; and/or (vii) transmit the insurance offering in real time to the user computing device for purchase by the user. The computer-executable instructions may provide additional, less, and/or alternative functionality, including that described elsewhere herein.

In another exemplary embodiment, a computer system for providing a flex insurance policy may be provided. The computer system may include at least one processor and/or associated transceiver in communication with at least one memory device. The at least one processor and/or associated transceiver may be configured to: (i) determine that a vehicle associated with a user is listed for rent on a peer-to-peer (P2P) car-sharing platform; and (ii) receive, from a computing device associated with the P2P car-sharing platform, vehicle listing information associated with the user. The vehicle listing information may include a user identifier associated with the user. The at least one processor and/or associated transceiver may also be configured to (iii) retrieve, from the memory device, a user profile associated with the user identifier. The user profile may include information associated with (a) a personal automobile insurance policy associated with the vehicle, and (b) a personal mobility policy associated with the user. The at least one processor and/or associated transceiver may also be configured to: (iv) extract, from the user profile, a first identifier associated with the personal automobile insurance policy and a second identifier associated with the personal mobility policy; and/or (v) automatically transmit, to an insurance provider computing device, instructions to (a) suspend and/or otherwise adjust (such as adjust the price, limits, deductibles, and/or coverages of) the personal automobile insurance policy associated with the first identifier, and (b) activate and/or otherwise adjust (such as adjust the price, limits, deductibles, and/or coverages of) the personal mobility policy associated with the second identifier. The computer system may include less, additional, and/or alternative functionality, including that described herein.

A further enhancement may be where the at least one processor and/or associated transceiver is further programmed to receive a confirmation message from the insurance provider computing device. A further enhancement may be where the at least one processor and/or associated is further programmed to: (i) generate a car-sharing insurance policy for the user; (ii) transmit the car-sharing insurance policy to a user computing device associated with the user; and/or (iii) activate the car-sharing insurance policy upon receiving a user selection to purchase the car-sharing insurance policy.

A further enhancement may be where the at least one processor and/or associated transceiver is further programmed to periodically perform a status check to determine whether the vehicle remains listed for rent on the P2P car-sharing platform. A further enhancement may be where, when the at least one processor determines that the vehicle remains listed for rent on the P2P car-sharing platform, the at least one processor is further programmed to update a log with a data entry indicating the status check. The data entry may include a date and time associated with the status check.

A further enhancement may be where, when the at least one processor determines that the vehicle is no longer listed for rent on the P2P car-sharing platform, the at least one processor and/or associated transceiver is further programmed to transmit, to the insurance provider computing device, instructions to (i) reinstate and/or otherwise adjust (such as adjust the price, limits, deductibles, and/or coverages of) the personal automobile insurance policy associated with the first identifier, and (ii) suspend and/or otherwise adjust (such as adjust the price, limits, deductibles, and/or coverages of) the personal mobility policy associated with the second identifier. A further enhancement may be where the at least one processor and/or associated transceiver is further programmed to (i) determine whether a car-sharing insurance policy associated with the vehicle is active, and/or (ii) transmit, to the insurance provider computing device, instructions to suspend and/or otherwise adjust the car-sharing insurance policy.

In one exemplary embodiment, a computer-implemented method for providing a flex insurance policy may be provided. The method may be implemented by a computer system including at least one processor and/or associated transceiver in communication with at least one memory device. The method may include, via the at least one processor and/or associated transceiver, (i) determining that a vehicle associated with a user is listed for rent on a peer-to-peer (P2P) car-sharing platform; (ii) receiving, from a computing device associated with the P2P car-sharing platform, vehicle listing information associated with the user, the vehicle listing information including a user identifier associated with the user; (iii) retrieving, from the memory device, a user profile associated with the user identifier, the user profile including information associated with (a) a personal automobile insurance policy associated with the vehicle, and (b) a personal mobility policy associated with the user; (iv) extracting, from the user profile, a first identifier associated with the personal automobile insurance policy, and a second identifier associated with the personal mobility policy; and/or (v) automatically transmitting, to an insurance provider computing device, instructions to (a) suspend and/or otherwise adjust (such as adjust the price, limits, deductibles, and/or coverages of) the personal automobile insurance policy associated with the first identifier, and (b) activate and/or otherwise adjust (such as adjust the price, limits, deductibles, and/or coverages of) the personal mobility policy associated with the second identifier. The method may include fewer, additional, and/or alternative steps, include those described elsewhere herein.

In another exemplary embodiment, a non-transitory computer-readable storage medium having computer-executable instructions embodied thereon may be provided. When executed by a computer system having at least one processor and/or associated transceiver in communication with at least one memory device, the computer-executable instructions may cause the at least one processor and/or associated transceiver to: (i) determine that a vehicle associated with a user is listed for rent on a peer-to-peer (P2P) car-sharing platform; (ii) receive, from a computing device associated with the P2P car-sharing platform, vehicle listing information associated with the user, the vehicle listing information including a user identifier associated with the user; (iii) retrieve, from the memory device, a user profile associated with the user identifier, the user profile including information associated with (a) a personal automobile insurance policy associated with the vehicle, and (b) a personal mobility policy associated with the user; (iv) extract, from the user profile, a first identifier associated with the personal automobile insurance policy, and a second identifier associated with the personal mobility policy; and/or (v) automatically transmit, to an insurance provider computing device, instructions to (a) suspend and/or otherwise adjust (such as adjust the price, limits, deductibles, and/or coverages of) the personal automobile insurance policy associated with the first identifier, and (b) activate and/or otherwise adjust (such as adjust the price, limits, deductibles, and/or coverages of) the personal mobility policy associated with the second identifier. The computer-executable instructions may provide additional, less, and/or alternative functionality, including that described elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, homes, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as historical traffic data, trip data, weather data, event data, and the like. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract trends and/or patterns in user behavior, relative to contextual data, that may then be used to generate intelligent user offerings.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, quantum computing components, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program. For instance, other memory types may include blockchain structures.

In one embodiment, a computer program is provided, and the program is embodied on a computer-readable medium. In one exemplary embodiment, the system is executed on a single computer system, without requiring a connection to a server computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An on-demand insurance (ODI) server for generating dynamic user offerings, the ODI server comprising at least one processor in communication with a memory device, the at least one processor programmed to:
   generate a user profile associated with a user by processing telematics data received from a user computing device associated with the user;
   receive, from the user computing device, an insurance policy request for a trip from a start location to an end location, the request including trip data and a user identifier associated with the user;
   determine at least one transportation mode available for the trip based upon the request;
   receive real-time contextual data associated with the trip and the user profile;
   determine, based upon at least the real-time contextual data and the user profile, at least one risk associated with use of the at least one transportation mode by the user during the trip;
   calculate, based upon the at least one risk, a risk score associated with the use of the at least one transportation mode;
   generate, based upon the calculated risk score, an insurance offering associated with the use of the at least one transportation mode; and
   transmit the insurance offering in real time to the user computing device for purchase by the user.

2. The ODI server of claim 1, wherein the real-time contextual data includes at least one of weather data, age of the user, data associated with the start location, and data associated with the end location.

3. The ODI server of claim 1, wherein the at least one transportation mode is one of a ride-sharing service and public transportation.

4. The ODI server of claim 1, wherein the at least one processor is further programmed to calculate the risk score by:
   retrieving, from the memory device using the user identifier, the user profile associated with the user;
   accessing, from the retrieved user profile, user preference data and historical insurance purchase data; and
   assessing the risk associated with the at least one transportation mode by analyzing the real-time contextual data, the user preference data, and the historical insurance purchase data.

5. The ODI server of claim 1, wherein the insurance offering includes a price associated with the insurance offering, the price associated with the calculated risk score.

6. The ODI server of claim 1, wherein the at least one processor is further programmed to:
   determine a plurality of transportation modes available for the trip by accessing transportation data associated with the trip;
   calculate a plurality of risk scores, each calculated for each of the plurality of transportation modes;
   compare the calculated risk scores to one another;
   rank, based upon the comparison, the plurality of transportation modes based upon the calculated risk scores;
   generate, based upon an associated rank, a plurality of insurance offerings, each generated for each of the plurality of transportation modes, wherein each insurance offering includes a price corresponding to the associated rank; and
   transmit the plurality of insurance offerings to the user computing device for selection by the user.

7. The ODI server of claim 1, wherein the at least one processor is further programmed to:
  determine a plurality of travel routes available for the trip by accessing transportation data associated with the trip;
  calculate a plurality of risk scores, each calculated for each of the plurality of travel routes;
  compare the calculated risk scores to one another;
  rank, based upon the comparison, the plurality of travel routes based upon the calculated risk scores;
  generate, based upon an associated rank, a plurality of insurance offerings, each generated for each of the plurality of travel routes, wherein each insurance offering includes a price corresponding to the associated rank; and
  transmit the plurality of insurance offerings to the user computing device for selection by the user.

8. The ODI server of claim 1, wherein the at least one processor is further programmed to provide a discount associated with the insurance offering when the risk score indicates that the at least one transportation mode is associated with a low level of risk to the user.

9. The ODI server of claim 1, wherein the at least one transportation mode is a ride via a bicycle from the start location to the end location, and wherein the at least one processor is further programmed to:
  access, from the memory device, bicycle data, the bicycle data including a make and model of the bicycle to be utilized for the trip by the user;
  generate, based upon the accessed bicycle data and the real-time contextual data, a bicycle insurance offering associated with the bicycle; and
  transmit the bicycle insurance offering to the user computing device for purchase by the user.

10. The ODI server of claim 1, wherein the at least one processor is further programmed to generate an interactive user interface configured to provide a gamification opportunity to the user to encourage the user to utilize less risky forms of transportation modes.

11. The ODI server of claim 10, wherein the gamification opportunity is a weekly challenge associated with a plurality of eligibility conditions for one or more incentives.

12. A computer-implemented method for generating dynamic user offerings, the method implemented by an on-demand insurance (ODI) server including at least one processor in communication with a memory device, the method comprising:
  generating a user profile associated with a user by processing telematics data received from a user computing device associated with the user;
  receiving, from the user computing device, an insurance policy request for a trip from a start location to an end location, the request including trip data and a user identifier associated with the user;
  determining at least one transportation mode available for the trip based upon the request;
  receiving real-time contextual data associated with the trip and the user profile;
  determining, based upon at least the real-time contextual data and the user profile, at least one risk associated with use of the at least one transportation mode by the user during the trip;
  calculating, based upon the at least one risk, a risk score associated with the use of the at least one transportation mode;
  generating, based upon the calculated risk score, an insurance offering associated with the use of the at least one transportation mode; and
  transmitting the insurance offering in real time to the user computing device for purchase by the user.

13. The computer-implemented method of claim 12, wherein the real-time contextual data includes at least one of weather data, age of the user, data associated with the start location, and data associated with the end location.

14. The computer-implemented method of claim 12, wherein the at least one transportation mode is one of a ride-sharing service and public transportation.

15. The computer-implemented method of claim 12, wherein calculating the risk score comprises:
  retrieving, from the memory device using the user identifier, the user profile associated with the user;
  accessing, from the retrieved user profile, user preference data and historical insurance purchase data; and
  assessing the risk associated with the at least one transportation mode by analyzing the real-time contextual data, the user preference data, and the historical insurance purchase data.

16. The computer-implemented method of claim 12, wherein the insurance offering includes a price associated with the insurance offering, the price associated with the calculated risk score.

17. The computer-implemented method of claim 12, further comprising:
  determining a plurality of transportation modes available for the trip by accessing transportation data associated with the trip;
  calculating a plurality of risk scores, each calculated for each of the plurality of transportation modes;
  comparing the calculated risk scores to one another;
  ranking, based upon the comparison, the plurality of transportation modes based upon the calculated risk scores;
  generating, based upon an associated rank, a plurality of insurance offerings, each generated for each of the plurality of transportation modes, wherein each insurance offering includes a price corresponding to the associated rank; and
  transmitting the plurality of insurance offerings to the user computing device for selection by the user.

18. The computer-implemented method of claim 12, further comprising:
  determining a plurality of travel routes available for the trip by accessing transportation data associated with the trip;
  calculating a plurality of risk scores, each calculated for each of the plurality of travel routes;
  comparing the calculated risk scores to one another;
  ranking, based upon the comparison, the plurality of travel routes based upon the calculated risk scores;
  generating, based upon an associated rank, a plurality of insurance offerings, each generated for each of the plurality of travel routes, wherein each insurance offering includes a price corresponding to the associated rank; and
  transmitting the plurality of insurance offerings to the user computing device for selection by the user.

19. The computer-implemented method of claim 12, further comprising providing a discount associated with the insurance offering when the risk score indicates that the at least one transportation mode is associated with a low level of risk to the user.

20. The computer-implemented method of claim 12, wherein the at least one transportation mode is a ride via a bicycle from the start location to the end location, and wherein the method further comprises:
- accessing, from the memory device, bicycle data, the bicycle data including a make and model of the bicycle to be utilized for the trip by the user;
- generating, based upon the accessed bicycle data and the real-time contextual data, a bicycle insurance offering associated with the bicycle; and
- transmitting the bicycle insurance offering to the user computing device for purchase by the user.

* * * * *